US011783809B2

(12) United States Patent
Shahbazi Mirzahasanloo et al.

(10) Patent No.: US 11,783,809 B2
(45) Date of Patent: Oct. 10, 2023

(54) USER VOICE ACTIVITY DETECTION USING DYNAMIC CLASSIFIER

(71) Applicant: QUALCOMM Incorporated, San Diego, CA (US)

(72) Inventors: Taher Shahbazi Mirzahasanloo, San Diego, CA (US); Rogerio Guedes Alves, Macomb Township, MI (US); Erik Visser, San Diego, CA (US); Lae-Hoon Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/308,593

(22) Filed: May 5, 2021

(65) Prior Publication Data

US 2022/0115007 A1 Apr. 14, 2022

Related U.S. Application Data

(60) Provisional application No. 63/089,507, filed on Oct. 8, 2020.

(51) Int. Cl.
*G10L 15/12* (2006.01)
*H04R 3/00* (2006.01)
*G10L 15/22* (2006.01)

(52) U.S. Cl.
CPC ............. *G10L 15/12* (2013.01); *G10L 15/22* (2013.01); *H04R 3/005* (2013.01)

(58) Field of Classification Search
CPC ....... G10L 21/0232; G10L 2021/02166; G10L 15/20; G10L 21/0205; G10L 21/038; G10L 21/0272; G10L 15/12; G10L 15/22; H04R 3/005
See application file for complete search history.

(56) References Cited

U.S. PATENT DOCUMENTS

| 8,903,721 B1* | 12/2014 | Cowan | H04R 3/005 704/226 |
| 9,830,913 B2* | 11/2017 | Thomsen | H04R 3/005 |
| 9,843,861 B1* | 12/2017 | Termeulen | H04R 1/1016 |
| 10,096,328 B1* | 10/2018 | Markovich-Golan | G10L 21/0216 |

(Continued)

OTHER PUBLICATIONS

International Search Report and Written Opinion—PCT/US2021/071503—ISA/EPO—dated Dec. 23, 2021.

*Primary Examiner* — Mohammad K Islam
(74) *Attorney, Agent, or Firm* — QUALCOMM Incorporated; Espartaco Diaz Hidalgo

(57) ABSTRACT

A device includes a memory configured to store instructions and one or more processors configured execute the instructions. The one or more processors are configured execute the instructions to receive audio data including first audio data corresponding to a first output of a first microphone and second audio data corresponding to a second output of a second microphone. The one or more processors are also configured to execute the instructions to provide the audio data to a dynamic classifier. The dynamic classifier is configured to generate a classification output corresponding to the audio data. The one or more processors are further configured to execute the instructions to determine, at least partially based on the classification output, whether the audio data corresponds to user voice activity.

28 Claims, 10 Drawing Sheets

(56) References Cited

U.S. PATENT DOCUMENTS

| | | | |
|---|---|---|---|
| 10,304,478 B2* | 5/2019 | Wang | G10L 25/18 |
| 2009/0220107 A1* | 9/2009 | Every | G10L 21/0208 |
| | | | 381/94.7 |
| 2011/0231185 A1* | 9/2011 | Kleffner | G10L 21/0272 |
| | | | 704/226 |
| 2011/0264447 A1* | 10/2011 | Visser | G10L 25/78 |
| | | | 704/208 |
| 2011/0288860 A1 | 11/2011 | Schevciw et al. | |
| 2012/0130713 A1* | 5/2012 | Shin | G10L 25/78 |
| | | | 704/E15.001 |
| 2015/0255090 A1* | 9/2015 | Kim | G10L 25/84 |
| | | | 704/233 |
| 2016/0267908 A1 | 9/2016 | Borjeson et al. | |
| 2018/0012616 A1* | 1/2018 | Salishev | H04R 1/04 |
| 2018/0020298 A1* | 1/2018 | Courtois | H04R 25/552 |
| 2018/0102135 A1* | 4/2018 | Ebenezer | G10L 25/84 |
| 2018/0102136 A1* | 4/2018 | Ebenezer | G10L 15/16 |
| 2018/0192191 A1* | 7/2018 | TerMeulen | H04R 1/406 |
| 2018/0270565 A1* | 9/2018 | Ganeshkumar | G10L 25/84 |
| 2018/0350394 A1 | 12/2018 | Saffran | |
| 2019/0098399 A1* | 3/2019 | Lashkari | H04R 1/406 |
| 2019/0251955 A1* | 8/2019 | Degraye | H04R 1/1083 |
| 2019/0259381 A1* | 8/2019 | Ebenezer | H04R 3/005 |
| 2019/0385635 A1* | 12/2019 | Shahentov | G10L 25/21 |
| 2020/0213726 A1* | 7/2020 | Dyrholm | H04R 3/005 |
| 2020/0302922 A1* | 9/2020 | Jazi | G10L 25/84 |
| 2021/0043223 A1* | 2/2021 | Lee | G06F 3/0346 |
| 2021/0306751 A1* | 9/2021 | Roach | H04R 1/1041 |

* cited by examiner

USER VOICE ACTIVITY DETECTION USING DYNAMIC CLASSIFIER

I. CROSS-REFERENCE TO RELATED APPLICATIONS

The present application claims priority from U.S. Provisional Patent Application No. 63/089,507, filed Oct. 8, 2020, entitled "USER VOICE ACTIVITY DETECTION USING DYNAMIC CLASSIFIER," which is incorporated herein by reference in its entirety.

II. FIELD

The present disclosure is generally related to self-voice activity detection.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. To illustrate, a headset device may include self-voice activity detection in an effort to distinguish between the user's speech (e.g., speech spoken by the person wearing the headset) and speech originating from other sources. For example, when a system including a headset device supports keyword activation, self-voice activity detection can reduce "false alarms" in which activation of one or more components or operations is initiated based on speech originating from nearby people (referred to as "non-user speech"). Reducing such false alarms improves power consumption efficiency of the device. However, performing audio signal processing to distinguish between user speech and non-user speech also consumes power, and conventional techniques to improve the accuracy of the device in distinguishing between user speech and non-user speech also tend to increase the power consumption and processing resource requirements of the device.

IV. SUMMARY

According to one implementation of the present disclosure, a device includes a memory configured to store instructions and one or more processors configured to execute the instructions. The one or more processors are configured to execute the instructions to receive audio data including first audio data corresponding to a first output of a first microphone and second audio data corresponding to a second output of a second microphone. The one or more processors are also configured to execute the instructions to provide the audio data to a dynamic classifier. The dynamic classifier is configured to generate a classification output corresponding to the audio data. The one or more processors are further configured to execute the instructions to determine, at least partially based on the classification output, whether the audio data corresponds to user voice activity.

According to another implementation of the present disclosure, a method includes receiving, at one or more processors, audio data including first audio data corresponding to a first output of a first microphone and second audio data corresponding to a second output of a second microphone. The method further includes providing, at the one or more processors, the audio data to a dynamic classifier to generate a classification output corresponding to the audio data. The method also includes determining, at the one or more processors and at least partially based on the classification output, whether the audio data corresponds to user voice activity.

According to another implementation of the present disclosure, a non-transitory computer-readable medium includes instructions that, when executed by one or more processors, cause the one or more processors to receive audio data including first audio data corresponding to a first output of a first microphone and second audio data corresponding to a second output of a second microphone. The instructions, when executed by the one or more processors, further cause the one or more processors to provide the audio data to a dynamic classifier to generate a classification output corresponding to the audio data. The instructions, when executed by the one or more processors, also cause the one or more processors to determine, at least partially based on the classification output, whether the audio data corresponds to user voice activity.

According to another implementation of the present disclosure, an apparatus includes means for receiving audio data including first audio data corresponding to a first output of a first microphone and second audio data corresponding to a second output of a second microphone. The apparatus further includes means for generating, at a dynamic classifier, a classification output corresponding to the audio data. The apparatus also includes means for determining, at least partially based on the classification output, whether the audio data corresponds to user voice activity.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Self-voice activity detection ("SVAD") that reduces "false alarms," in which activation of one or more components or operations results from non-user speech, can improve power consumption efficiency of the device by preventing activation of such components or operations when false alarms are detected. However, conventional audio signal processing techniques to improve SVAD accuracy also increase power consumption and processing resources of the device while performing the improved-accuracy techniques. Since SVAD processing is typically continually operating, even while the device is in a low-power or sleep mode, the reduction in power consumption due to reducing false alarms using conventional SVAD techniques can be partially or fully offset by increased power consumption associated with the SVAD processing itself.

Systems and methods of self-voice activity detection using a dynamic classifier are disclosed. For example, in a headset implementation, audio signals may be received from a first microphone that is positioned to capture the user's voice and from a second microphone that is positioned to capture external sounds, such as to perform noise reduction and echo cancellation. The audio signals may be processed to extract frequency domain feature sets including interaural phase differences ("IPDs") and interaural intensity differences ("IIDs").

The dynamic classifier processes the extracted frequency domain feature sets and generates an output indicating classification of the feature sets. The dynamic classifier may perform adaptive clustering of the feature data and adjustment of a decision boundary between the two most discriminative categories of the feature data space to distinguish between feature sets corresponding to user voice activity and feature sets corresponding to other audio activity. In an illustrative example, the dynamic classifier is implemented using self-organizing maps.

The dynamic classifier enables discrimination using the extracted feature sets to actively respond and adapt to various conditions, such as: environmental conditions in highly nonstationary situations; mismatched microphones; changes in user headset fitting; different user head-related transfer functions ("HRTFs"); direction-of-arrival ("DOA") tracking of non-user signals; noise floor, bias, and sensitivities of microphones across the frequency spectrum; or a combination thereof. In some implementations, the dynamic classifier enables adaptive feature mapping capable of responding to such variations and reducing or minimizing a number of thresholding parameters used and an amount of headset tuning by customers. In some implementations, the dynamic classifier enables effective discrimination between user voice activity and other audio activity with high accuracy under varying conditions and with relatively low power consumption as compared to conventional SVAD systems that provide comparable accuracy.

Figure 1:
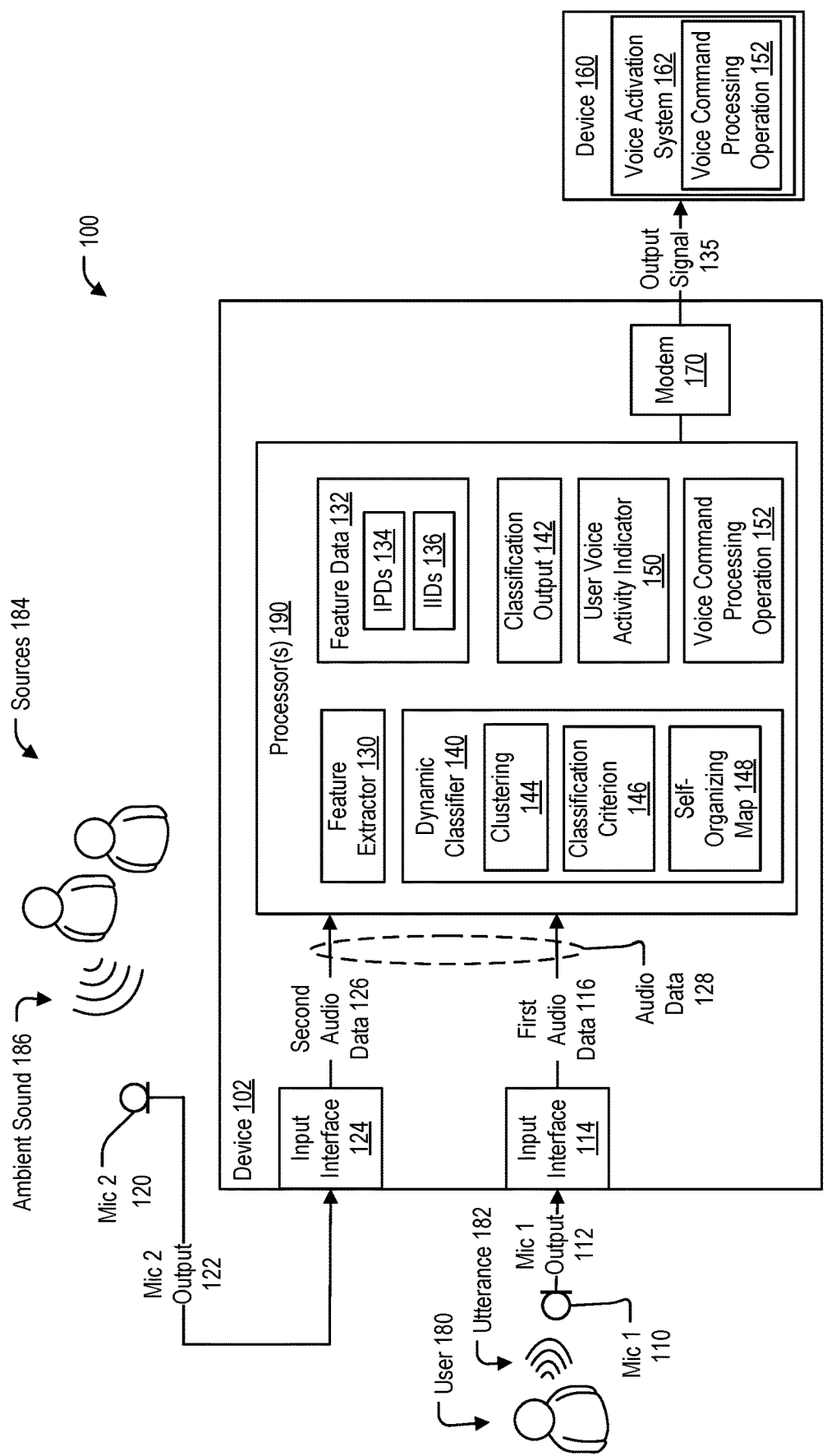
FIG. 1 is a block diagram of a particular illustrative aspect of a system operable to perform self-voice activity detection, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190. For ease of reference herein, such features are generally introduced as "one or more" features and are subsequently referred to in the singular unless aspects related to multiple of the features are being described.

It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform self-voice activity detection using a dynamic classifier is disclosed and generally designated 100. The system 100 includes a device 102 that is coupled to a first microphone 110, a second microphone 120, and a second device 160. The device 102 is configured to perform self-voice activity detection of sounds captured by the microphones 110, 120 using a dynamic classifier 140. To illustrate, in an implementation in which the device 102 corresponds to a headset, the first microphone 110 (e.g., a "primary" microphone) may be configured to primarily capture utterances of a user of the device 102, such as microphone positioned proximate to the mouth of a wearer of the device 102, and the second microphone 120 (e.g., a "secondary" microphone) may be configured to primarily capture ambient sound, such as positioned proximate to an ear of the wearer. In other implementations, such as when the device 102 corresponds to a standalone voice assistant (e.g., including a loudspeaker with microphones, as described further with reference to FIG. 11) that may be in the vicinity of multiple people, the device 102 may be configured to detect speech from the person closest to the primary microphone as self-voice activity, even though the person may be relatively remote from the primary microphone as compared to in a headset implementation. As used herein, the term "self-voice activity detection" is used interchangeably with "user voice activity detection" to indicate distinguishing between speech (e.g., voice or utterance) of a user of the device 102 (e.g., "user voice activity") as compared to sounds that do not originate from a user of the device (e.g., "other audio activity").

The device 102 includes a first input interface 114, a second input interface 124, one or more processors 190, and a modem 170. The first input interface 114 is coupled to the processor 190 and configured to be coupled to the first microphone 110. The first input interface 114 is configured to receive a first microphone output 112 from the first microphone 110 and to provide the first microphone output 112 to the processor 190 as first audio data 116.

The second input interface 124 is coupled to the processor 190 and configured to be coupled to the second microphone 120. The second input interface 124 is configured to receive a second microphone output 122 from the second microphone 120 and to provide the second microphone output 122 to the processor 190 as second audio data 126.

The processor 190 is coupled to the modem 170 and includes a feature extractor 130 and the dynamic classifier 140. The processor is configured to receive audio data 128 including the first audio data 116 corresponding to the first output 112 of the first microphone 110 and the second audio data 126 corresponding to the second output 122 of the second microphone 120. The processor 190 is configured to process the audio data 128 at the feature extractor 130 to generate feature data 132.

In some implementations, the processor 190 is configured to process the first audio data 116 and the second audio data 126 prior to generating feature data 132. In an example, the processor 190 is configured to perform echo-cancellation, noise suppression, or both, on the first audio data 116 and the second audio data 126. In some implementations, the processor 190 is configured to transform the first audio data 116 and the second audio data 126 (e.g., a Fourier transform) to a transform domain prior to generating the feature data 132.

The processor 190 is configured to generate feature data 132 based on the first audio data 116 and the second audio data 126. In accordance with some aspects, the feature data 132 includes at least one interaural phase difference 134 between the first audio data 116 and the second audio data 126 and at least one interaural intensity difference 136 between the first audio data 116 and the second audio data 126. In a particular example, the feature data 132 includes interaural phase differences (IPDs) 134 for multiple frequencies and interaural intensity differences (IIDs) 136 for multiple frequencies.

The processor 190 is configured to process the feature data 132 at the dynamic classifier 140 to generate a classification output 142 of the feature data 132. In some implementations, the dynamic classifier 140 is configured to adaptively cluster sets (e.g., samples) of the feature data 132 based on whether a sound represented in the audio data 128 originates from a source that is closer to the first microphone 110 than to the second microphone 120. For example, the dynamic classifier 140 may be configured to receive a sequence of samples of the feature data 132 and adaptively cluster the samples in a feature space containing IID and IPD frequency values.

The dynamic classifier 140 may also be configured to adjust a decision boundary between the two most discriminative categories of the feature space to distinguish between sets of feature data corresponding to user voice activity (e.g., an utterance 182 of a user 180) and sets of feature data corresponding to other audio activity. To illustrate, the dynamic classifier 140 may be configured to classify incoming feature data into one of two classes (e.g., class 0 or class 1), where one of the two classes corresponds to user voice activity, and the other of the two classes corresponds to other audio activity. The classification output 142 may include a single bit or flag that has one of two values: a first value (e.g., "0") to indicate that the feature data 132 corresponds to one of the two classes; or a second value (e.g., "1") to indicate that the feature data 132 corresponds to the other of the two classes.

In some implementations, the dynamic classifier 140 performs clustering and vector quantization. For example, clustering includes reducing (e.g., minimizing) the within-cluster sum of squares, defined as min $\Sigma_{i=1}^{n}\Sigma_{x_j \in C_i} p_i \|x_j - \mu_i\|^2$, where $C_i$ represents cluster i, $p_i$ represents a weight assigned to cluster i, $x_j$ represents a node j in the feature space, and $\mu_i$ represents the centroid of cluster i. The cluster weight $p_i$ may be probabilistic, such as a prior cluster distribution; possibilistic, such as a confidence measure assigned to possibility of each cluster; or determined by any other factor that would enforce some form of non-uniform bias towards different clusters. Vector quantization includes reducing (e.g., minimizing) error by quantizing an input vector into a quantization weight vector defined by min $\Sigma_{i=1}^{n}\Sigma_{x_j \in C_i} p_i \|x_j - w_i\|^2$, where $w_i$ represents quantization weight vector i.

In some implementations, the dynamic classifier 140 is configured to perform competitive learning in which units of quantization compete to absorb new samples of the feature data 132. The winning unit is then adjusted in the direction of the new sample. For example, each unit's weight vector may be initialized for separation or randomly. For each new sample of feature data that is received, a determination is made as to which weight vector is closest to the new sample, such as based on Euclidean distance or inner product similarity, as non-limiting examples. The weight vector closest to the new sample (the "winner" or best matching unit) may then be moved in the direction of the new sample. For example, in Hebbian learning, the winners strengthen their correlations with the input, such by adjusting the weights between two nodes in proportion to the product of the inputs to the two nodes.

In some implementations, the dynamic classifier 140 includes local clusters in a presynaptic sheet that are connected to local clusters in a postsynaptic sheet, and interconnections among neighboring neurons are reinforced through Hebbian learning to strengthen connections between correlating stimulations. The dynamic classifier 140 may include a Kohonen self-organizing map in which the input is connected to every neuron in the postsynaptic sheet or the map. Learning causes the map to be localized in that different fields of absorption respond to different regions of input space (e.g., the feature data space).

In a particular implementation, the dynamic classifier 140 includes a self-organizing map 148. The self-organizing map 140 may operate by initializing weight vectors, and then for each input t (e.g., each received set of the feature data 132), determining the winning unit (or cell or neuron) according to $$v(t) = \arg\min_{i} \|x(t) - w_i(t)\|,$$

to find the winner v(t) as the unit that has the smallest distance (e.g., Euclidean distance) to the input x(t). The weights of the winning unit and its neighbors are updated, such as according to $\Delta w_i(t) = a(t) l(v, i, t)[x(t) - w_v(t)]$, where $\Delta w_i(t)$ represents the change for unit i, a(t) represents a learning parameter, and l(v, i, t) represents a neighborhood function around the winning unit, such as a Gaussian radial basis function. In some implementations, inner products or another metric can be used as the similarity measure instead of Euclidean distance.

Figure 4:
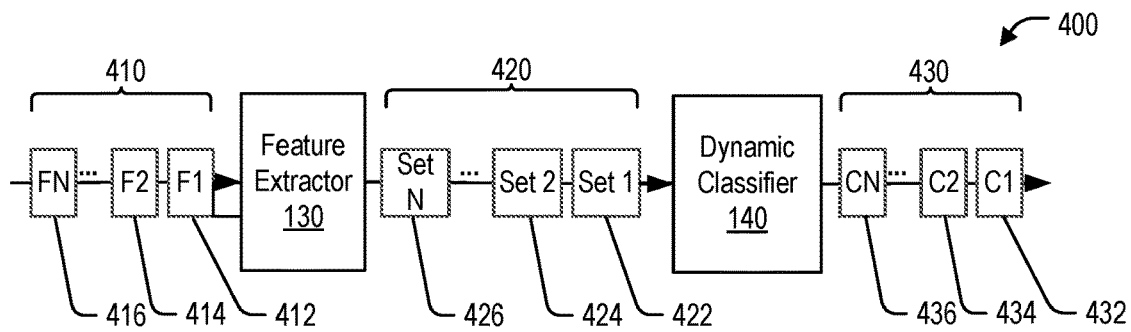
FIG. 4 is a diagram of an illustrative aspect of operation of components of the system of FIG. 1, in accordance with some examples of the present disclosure.

In some implementations, the dynamic classifier 140 includes a variant of a Kohonen self-organizing map to accommodate sequences of speech samples, such as described further with reference to FIG. 4. In an example, the dynamic classifier 140 may implement temporal sequence processing, such as according to a temporal Kohonen map in which an activation function with a time constant modeling decay ("D") is defined for each unit and updated as $U_i(t, D) = D$, $U_i(t-1, D) - \frac{1}{2}\|x(t) - w_i(t)\|^2$, and the winning unit is the unit having the largest activity. As another example, the dynamic classifier 140 may implement a recurrent network, such as according to a recurrent self-organizing map which uses a difference vector y instead of a squared norm: $y_i(t, \gamma) = (1-\gamma) y_i(t-1, \gamma) + \gamma(x(t) - w_i(t))$, where $\gamma$ represents a forgetting factor having a value between 0 and 1, the winning unit is determined as the unit with the smallest difference vector $$v(t) = \arg\min_{i} \|y_i(t, \gamma)\|,$$

and the weights are updated as $\Delta w_i(t) = a(t) l(v, i, t)[x(t) - y_v(t, \gamma)]$.

In some implementations, the processor 190 is configured to update a clustering operation 144 of the dynamic classifier 140 based on the feature data 132 and to update a classification decision criterion 146 of the dynamic classifier 140. For example, as explained above, the processor 190 is configured to adapt the clustering and the decision boundary between user voice activity and other audio activity based on incoming samples of the audio data 128, enabling the dynamic classifier 140 to adjust operation based on changing conditions of the user 180, the environment, other conditions (e.g., microphone placement or adjustment), or any combination thereof.

Although the dynamic classifier 140 is illustrated as including the self-organizing map 148, in other implementations the dynamic classifier 140 may incorporate one or more other techniques to generate the classification output 142 instead of, or in addition to, the self-organizing map 148. As non-limiting examples, the dynamic classifier 140 may include a restricted Boltzmann machine having an unsupervised configuration, an unsupervised autoencoder, an online variation of Hopfield networks, online clustering, or a combination thereof. As another non-limiting example, the dynamic classifier 140 may be configured to perform a principal component analysis (e.g., sequentially fitting a set orthogonal direction vectors to the feature vector samples in the feature space, where each direction vector is selected as maximizing the variance of the feature vector samples projected onto the direction vector in feature space). As another non-limiting example, the dynamic classifier 140 may be configured to perform an independent component analysis (e.g., determining a set of additive subcomponents of the feature vector samples in the feature space, with the assumption that the subcomponents are non-Gaussian signals that are statistically independent from each other).

The processor 190 is configured to determine, at least partially based on the classification output 142, whether the audio data 128 corresponds to user voice activity and to generate a user voice activity indicator 150 that indicates whether user voice activity is detected. For example, although the classification output 142 may indicate whether the feature data 132 is classified as one of two classes (e.g., class "0" or class "1"), the classification output 142 may not indicate which class corresponds to user voice activity and which class corresponds to other audio activity. For example, based on how the dynamic classifier 140 is initialized and the feature data that has been used to update the dynamic classifier 140, in some cases the classification output 142 having the value "0" indicates user voice activity, while in other cases the classification output having the value "0" indicates other audio activity. The processor 190 may determine which of the two classes indicates user voice activity and which of the two classes indicates other audio activity, further based on at least one of a sign or a magnitude of at least one value of the feature data 132, as described further with reference to FIG. 2.

To illustrate, sound propagation of the utterance 182 from the mouth of the user 180 to the first microphone 110 and to the second microphone 120 results in a phase difference (due to the utterance 182 arriving at the first microphone 110 before the second microphone 120) and a signal strength difference that may be detected in the feature data 132 and that may be distinguishable from phase and signal strength differences of sound from other audio sources. The phase and signal strength differences may be determined from the IPDs 134 and the IIDs 136 in the feature data 132 and used to map the classification output 142 to user voice activity or other audio activity. The processor 190 may generate a user voice activity indicator 150 that indicates whether the audio data 128 corresponds to user voice activity.

In some implementations, the processor 190 is configured to initiate a voice command processing operation 152 in response to a determination that the audio data 128 corresponds to user voice activity. In an illustrative example, the voice command processing operation 152 includes a voice activation operation, such as keyword or key phrase detection, voice print authentication, natural language processing, one or more other operations, or any combination thereof. As another example, the processor 190 may process the audio data 128 to perform a first stage of keyword detection and may use the user voice activity indicator 150 to confirm that a detected keyword was spoken by the user 180 of the device 102, rather than by a nearby person, prior to initiating further processing of the audio data 128 via the voice command processing operation 152 (e.g., at a second stage of detection that includes more powerful voice activity recognition and speech recognition operations).

The modem 170 is coupled to the processor 190 and is configured to enable communication with the second device 160, such as via wireless transmission. In some examples, the modem 170 is configured to transmit the audio data 128 to the second device 160 in response to a determination that the audio data 128 corresponds to user voice activity based on the dynamic classifier 140. For example, in an implementation in which the device 102 corresponds to a headset device that is wirelessly coupled to the second device 160, (e.g., a Bluetooth connection to a mobile phone or computer), the device 102 may send the audio data 128 to the second device 160 to perform the voice command processing operation 152 at a voice activation system 162 of the second device 160. In this example, the device 102 offloads more computationally expensive processing (e.g., the voice command processing operation 152) to be performed using the greater processing resources and power resources of the second device 160.

In some implementations, the device 102 corresponds to or is included in one or various types of devices. In an illustrative example, the processor 190 is integrated in a headset device that includes the first microphone 110 and the second microphone 120. The headset device is configured, when worn by the user 180, to position the first microphone 110 closer than the second microphone 120 to the user's mouth to capture utterances 182 of the user 180 at the first microphone 110 with greater intensity and less delay as compared to at the second microphone 120, such as described further with reference to FIG. 7. In other examples, the processor 190 is integrated in at least one of a mobile phone or a tablet computer device, as described with reference to FIG. 6, a wearable electronic device, as described with reference to FIG. 8, a voice-controlled speaker system, as described with reference to FIG. 9, a camera device, as described with reference to FIG. 10, or a virtual reality headset, mixed reality headset, or an augmented reality headset, as described with reference to FIG. 11. In another illustrative example, the processor 190 is integrated into a vehicle that also includes the first microphone 110 and the second microphone 120, such as described further with reference to FIG. 12 and FIG. 13.

During operation, the first microphone 110 is configured to capture utterances 182 of a user 180, and the second microphone 120 is configured to capture ambient sound 186. In one example, an utterance 182 from a user 180 of the device 102 is captured by the first microphone 110 and by the second microphone 120. Because the first microphone 110 is nearer the mouth of the user 180, the speech of the user 180 is captured by the first microphone 110 with higher signal strength and less delay as compared to the second microphone 120. In another example, ambient sound 186 from one or more sound sources 184 (e.g., a conversation between two nearby people) may be captured by the first microphone 110 and by the second microphone 120. Based on the position and distance of the sound sources 184 relative to the first microphone 110 and the second microphone 120, a signal strength difference and relative delay between capturing the ambient sound 186 at the first microphone 110 and the second microphone 120 will vary from that for the utterance 182 from the user 180.

The first audio data 116 and the second audio data 126 are processed at the processor 190, such as by performing echo cancellation, noise suppression, frequency domain transform etc. The resulting audio data is processed at the feature extractor 130 to generate the feature data 132 including the IPDs 134 and the IIDs 136. The feature data 132 is input to the dynamic classifier 140 to generate the classification output 142, which is interpreted by the processor 190 as either user voice activity or other sound activity. The processor 190 generates the user voice activity indicator 150, such as a "0" value to indicate the audio data 128 corresponds to user voice activity, or a "1" value to indicate the audio data 128 corresponds to other audio activity (or vice versa).

The user voice activity indicator 150 can be used to determine whether to initiate the voice command processing operation 152 at the device 102. Alternatively, or in addition, the user voice activity indicator 150 can be used to determine whether to initiate generation of an output signal 135 (e.g., the audio data 128) to the second device 160 for further processing at the voice activation system 162.

In addition, in conjunction with generating the classification output 142, the dynamic classifier 140 is updated based on the feature data 132, such as by adjusting weights of the winning unit and its neighbors to be more similar to the feature data 132, updating the clustering operation 144, the classification criterion 146, or a combination thereof. In this manner, the dynamic classifier 140 automatically adapts to changes in the user speech, changes in the environment, changes in the characteristics of the device 102 or the microphones 110, 120, or a combination thereof.

The system 100 thus improves performance of self-voice activity detection by using the dynamic classifier 140 to discriminate between user voice activity and other audio activity with relatively low complexity, low power consumption, and high accuracy as compared to conventional self-voice activity detection techniques. Automatically adapting to user and environment changes provides improved benefit by reducing or eliminating calibration to be performed by the user and enhancing the user's experience.

Although in some implementations the processor 190 provides the audio data 128 to the dynamic classifier 140 in the form of the feature data 132 (e.g., frequency domain data) that is generated by the feature extractor 130, in other implementations the feature extractor 130 is omitted. In an example, the processor 190 provides the audio data 128 to the dynamic classifier 140 as a time series of audio samples, and the dynamic classifier 140 processes the audio data 128 to generate the classification output 142. In an illustrative implementation, the dynamic classifier 140 is configured to determine frequency domain data from the audio data 128 (e.g., generate the feature data 132) and use the extracted frequency domain data to generate the classification output 142.

Although the first microphone 110 and the second microphone 120 are illustrated as being coupled to the device 102, in other implementations one or both of the first microphone 110 or the second microphone 120 may be integrated in the device 102. Although the two microphones 110, 120 are illustrated, in other implementations one or more additional microphones configured to capture user speech, one or more microphones configured to capture environmental sounds, or both, may be included. Although the system 100 is illustrated as including the second device 160, in other implementations the second device 160 may be omitted, and the device 102 may perform operations described as being performed at the second device 160.

Figure 2:
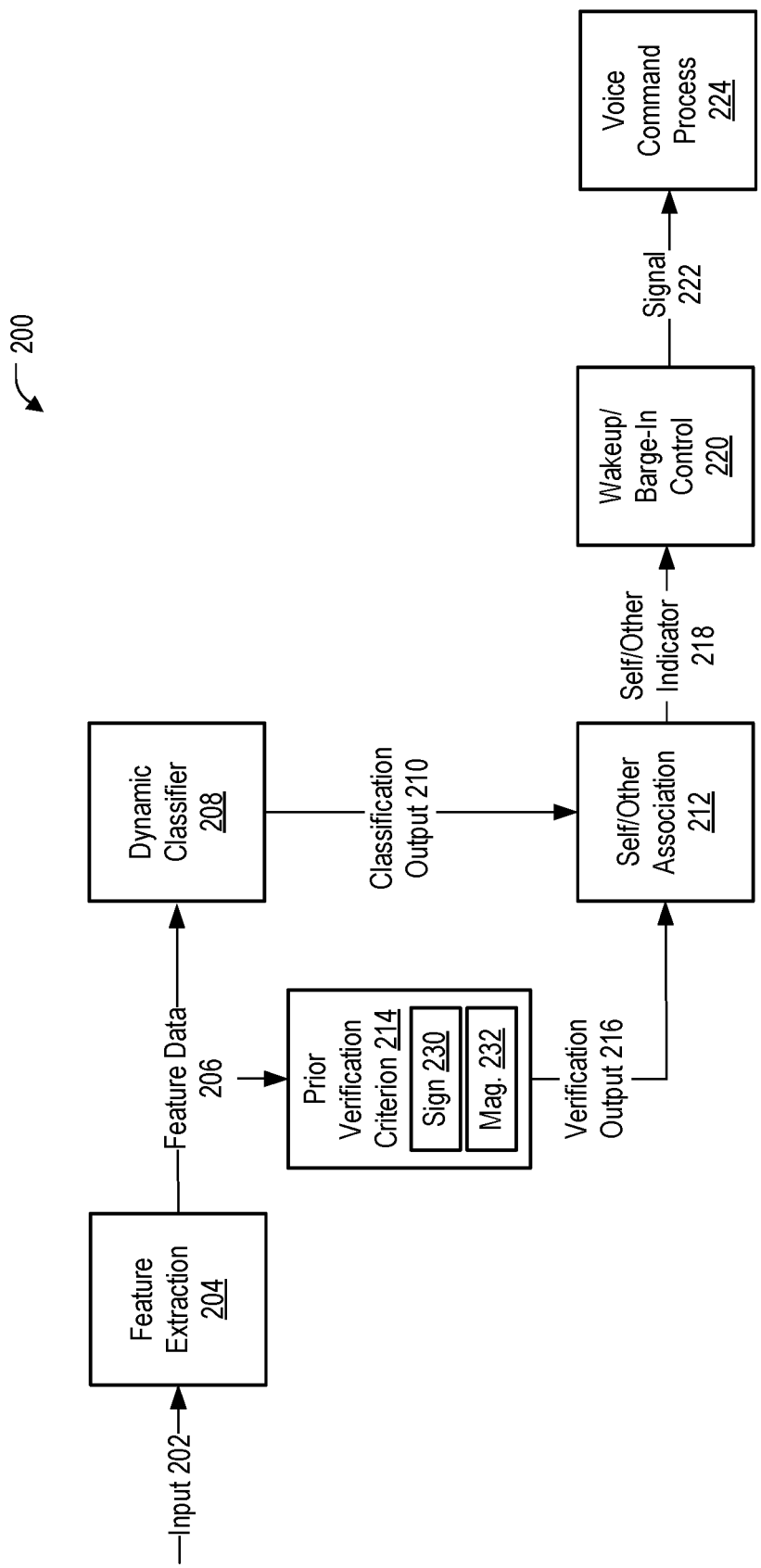
FIG. 2 is a diagram of an illustrative aspect of operations associated with self-voice activity detection, in accordance with some examples of the present disclosure.

FIG. 2 is a diagram of an illustrative aspect of operations 200 associated with self-voice activity detection that may be performed by the device 102 of FIG. 1 (e.g., the processor 190). Feature extraction 204 is performed on an input 202 to generate feature data 206. In an example, the input 202 corresponds to the audio data 128, the feature extraction 204 is performed by the feature extractor 130, and the feature data 206 corresponds to the feature data 132.

A dynamic classifier 208 operates on the feature data 206 to generate a classification output 210. In an example, the dynamic classifier 208 corresponds to the dynamic classifier 140 and is configured to perform unsupervised real-time clustering based on the feature data 206 with highly dynamic decision boundaries for "self" vs "other" labeling for voice activation classes in a classification output 210. For example, the dynamic classifier 208 may divide the feature space into two classes, one class associated with user voice activity and the other class associated with other sound activity. The classification output 210 may include a binary indicator of which class is associated with the feature data 206. In an example, the classification output 210 corresponds to the classification output 142.

A self/other association operation 212 generates a self/other indicator 218 based on the classification output 210 and a verification input 216. The verification input 216 may provide information that associates each of the classes of the classification output 210 with user voice activity (e.g., "self") or other sound activity (e.g., "other"). For example, the verification input 216 may be generated based on at least one prior verification criterion 214, such as comparing a sign 230 of a phase difference (e.g., a value of one or more of the IPDs 134 over one or more particular frequency ranges, indicating which microphone is closer to the source of the audio represented by the input 202), comparing a magnitude 232 of an intensity difference (e.g., a value of one or more of the IIDs 136 over one or more particular frequency ranges, indicating relative distances of the source of the audio to the separate microphones), or a combination thereof. For example, the self/other association may determine that a classification output 210 value of "0" corresponds to feature data 206 exhibiting a negative sign 230 in one or more pertinent frequency ranges, or exhibiting a magnitude 232 less than a threshold amount in one or more pertinent frequency ranges, or both, and as a result may populate a table such that "0" corresponds to "other" and "1" corresponds to "self."

The self/other association operation 212 results in generation of a self/other indicator 218 (e.g., a binary indicator having a first value (e.g., "0") to indicate user voice activity or having a second value (e.g., "1") to indicate other sound activity, or vice-versa). A wakeup/barge-in control operation 220 is responsive to the self/other indicator 218 to generate a signal 222 to a voice command process 224. For example, the signal 222 may have a first value (e.g., "0") to indicate that the voice command process 224 is to be executed on the input 202, the feature data 206, or both, to perform further voice command processing (e.g., to perform keyword detection, voice authentication, or both) when the input 202 corresponds to user voice activity, or may have a second value (e.g., "1") to indicate that the voice command process 224 is not to perform the voice command processing when the input 202 corresponds to other sound activity.

Dynamic classification, such as described with reference to the dynamic classifier 140 of FIG. 1 and the dynamic classifier 208 of FIG. 2, assists with improving SVAD accuracy, with the objectives of responding only when the user speaks and always suppressing responses when other interferences (e.g., external speech) arrive, and maximizing the self-keyword acceptance rate ("SKAR") and the other keyword rejection rate ("OKRR"). By using dynamic classification, various challenges associated with conventional SVAD processing are circumvented or otherwise reduced. For example, conventional SVAD processing challenges that are circumvented or reduced via implementation of dynamic classification include noise and echo conditions (which may cause erroneous wakeup and barge-in under severe conditions), microphone mismatch and sensitivity, voice activation engine dependence, different user head-related transfer functions (HRTFs), different headset hardware effects, user's behavior driven variations of occlusion and isolation levels, user's feature resemblance of other voice activity, final negative effects on voice activation, and response delay of onset of user speech. To illustrate, conventional SVAD is highly dependent on internal/external microphone calibration and sensitivities, directions of arrival of interfering speech, variations of headset fitting and isolation, and non-stationary statistics of features, which may be accommodated by operation of dynamic classification.

Use of dynamic classification enables discrimination using the extracted feature data 206 to actively respond and adapt to various conditions, such as: environmental conditions in highly nonstationary situations; mismatched microphones; changes in user headset fitting; different user head-related transfer functions; direction-of-arrival ("DOA") tracking of non-user signals; and noise floor, bias, and sensitivities of microphones across the frequency spectrum. Dynamic classification enables adaptive feature mapping capable of responding to such variations and reducing or minimizing a number of thresholding parameters used and an amount of headset tuning by customers.

Figure 3:
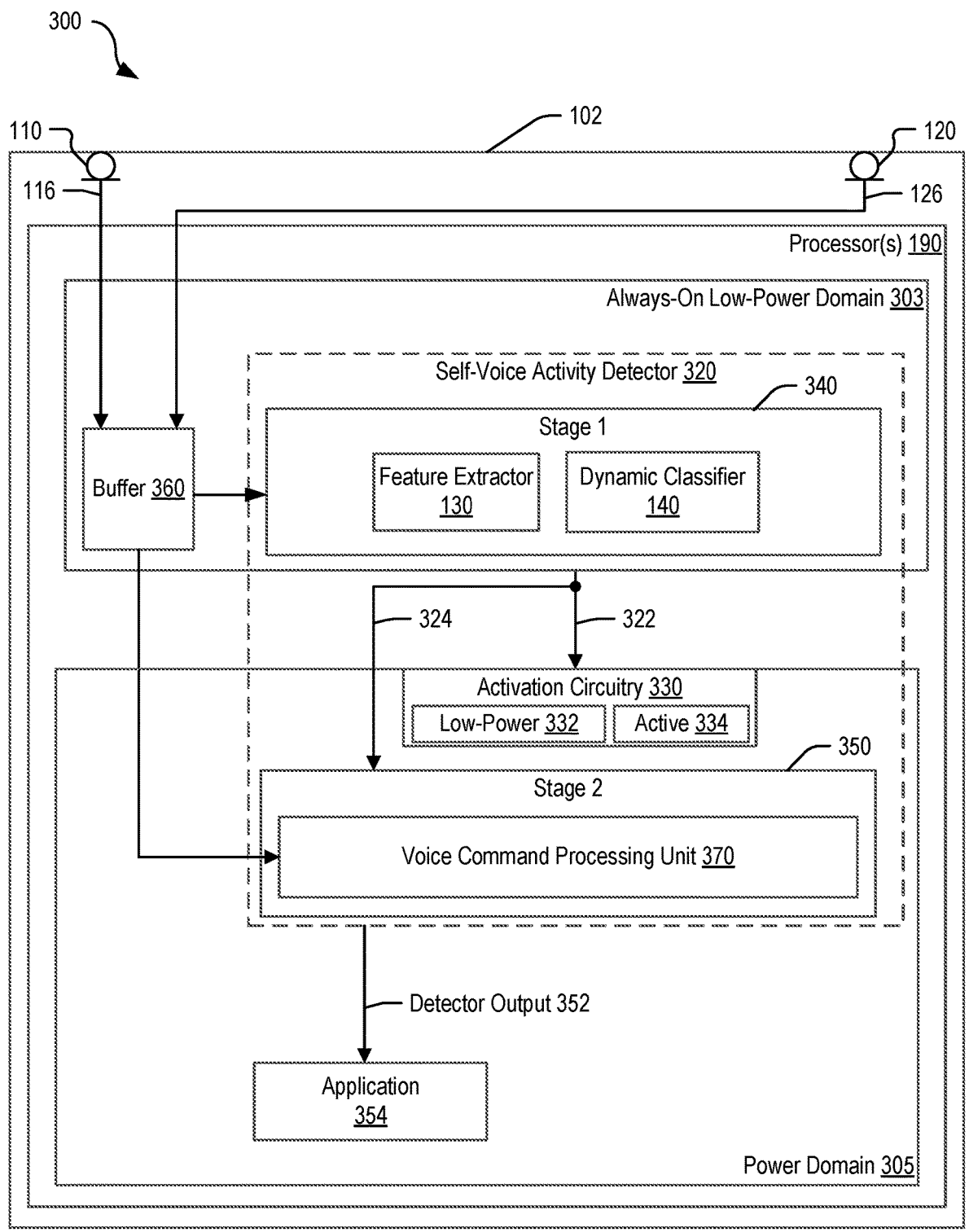
FIG. 3 is a block diagram of an illustrative aspect of a system operable to perform self-voice activity detection, in accordance with some examples of the present disclosure.

FIG. 3 is a block diagram of an illustrative aspect of a system operable to perform self-voice activity detection, in accordance with some examples of the present disclosure, in which the processor 190 includes an always-on power domain 303 and a second power domain 305, such as an on-demand power domain. In some implementations, a first stage 340 of a self-voice activity detector 320 and a buffer 360 are configured to operate in an always-on mode, and a second stage 350 of the self-voice activity detector 320 is configured to operate in an on-demand mode.

The always-on power domain 303 includes the buffer 360, the feature extractor 130, and the dynamic classifier 140. The buffer 360 is configured to store the first audio data 116 and the second audio data 126 to be accessible for processing by components of the self-voice activity detector 320.

The second power domain 305 includes a voice command processing unit 370 in the second stage 250 of the self-voice activity detector 320 and also includes activation circuitry 330. In some implementations, the voice command processing unit 370 is configured to perform the voice command processing operation 152 of FIG. 1 or the voice command process 224 of FIG. 2.

The first stage 240 of the self-voice activity detector 320 is configured to generate at least one of a wakeup signal 322 or an interrupt 324 to initiate the voice command processing operation 152 (or the voice command process 224) at the voice command processing unit 370. In an example, the wakeup signal 322 is configured to transition the second power domain 305 from a low-power mode 332 to an active mode 334 to activate the voice command processing unit 370. In some implementations, the wakeup signal 322, the interrupt 324, or both, correspond to the signal 222 of FIG. 2.

For example, the activation circuitry 330 may include or be coupled to power management circuitry, clock circuitry, head switch or foot switch circuitry, buffer control circuitry, or any combination thereof. The activation circuitry 330 may be configured to initiate powering-on of the second stage 350, such as by selectively applying or raising a voltage of a power supply of the second stage 350, of the second power domain 305, or both. As another example, the activation circuitry 330 may be configured to selectively gate or un-gate a clock signal to the second stage 350, such as to prevent or enable circuit operation without removing a power supply.

A detector output 352 generated by the second stage 350 of the self-voice activity detector 320 is provided to an application 354. The application 354 may be configured to perform one or more operations based on detected user speech. To illustrate, the application 354 may correspond to a voice interface application, an integrated assistant application, a vehicle navigation and entertainment application, or a home automation system, as illustrative, non-limiting examples.

By selectively activating the second stage 350 based on a result of processing audio data at the first stage 340 of the self-voice activity detector 320, overall power consumption associated with self-voice activity detection, voice command processing, or both, may be reduced.

FIG. 4 is a diagram of an illustrative aspect of operation of components of the system of FIG. 1, in accordance with some examples of the present disclosure. The feature extractor 130 is configured to receive a sequence 410 of audio data samples, such as a sequence of successively captured frames of the audio data 128, illustrated as a first frame (F1) 412, a second frame (F2) 414, and one or more additional frames including an Nth frame (FN) 416 (where N is an integer greater than two). The feature extractor 130 is configured to output a sequence 420 of sets of feature data including a first set 422, a second set 424, and one or more additional sets including an Nth set 426.

The dynamic classifier 140 is configured to receive the sequence 420 of sets of feature data and to adaptively cluster a set (e.g., the second set 424) of the sequence 420 at least partially based on a prior set (e.g., the first set 422) of feature data in the sequence 420. As illustrative, non-limiting examples, the dynamic classifier 140 may be implemented as a temporal Kohonen map or a recurrent self-organizing map.

During operation, the feature extractor 130 processes the first frame 412 to generate the first set 422 of feature data, and the dynamic classifier 140 processes the first set 422 of feature data to generate a first classification output (C1) 432 of a sequence 430 of classification outputs. The feature extractor 130 processes the second frame 414 to generate the second set 424 of feature data, and the dynamic classifier 140 processes the second set 424 of feature data to generate a second classification output (C2) 434 based on the second set 424 of feature data and at least partially based on the first set 422 of feature data. Such processing continues, including the feature extractor 130 processing the Nth frame 416 to generate the Nth set 426 of feature data, and the dynamic classifier 140 processes the Nth set 426 of feature data to generate an Nth classification output (CN) 436. The Nth classification output 436 is based on the Nth set 426 of feature data and at least partially based on one or more of the previous sets of feature data of the sequence 420.

By dynamically classifying based on one or more prior sets of feature data, accuracy of classification by the dynamic classifier 140 may be improved for speech signals that may span multiple frames of audio data.

Figure 5:
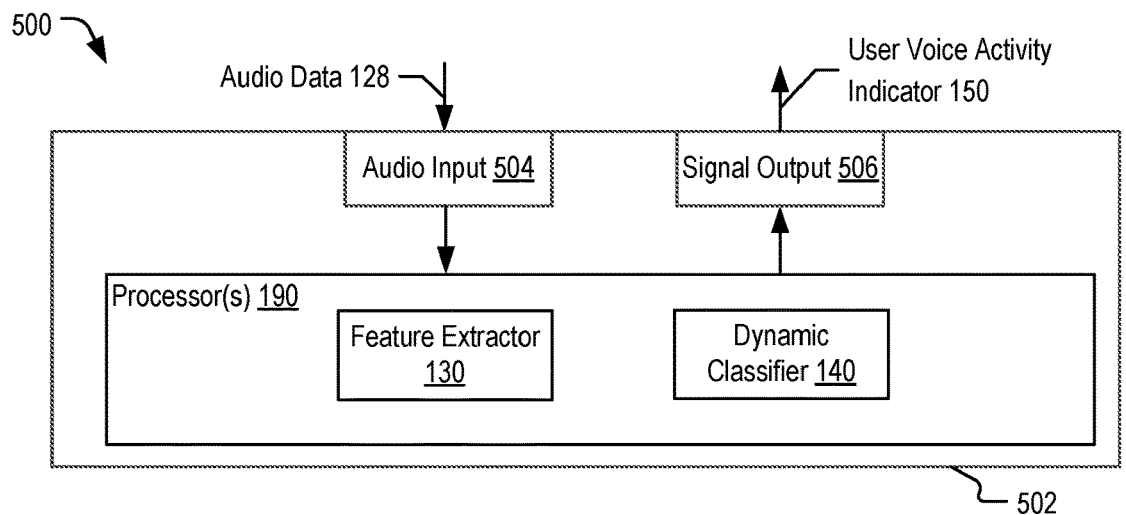
FIG. 5 illustrates an example of an integrated circuit that includes a dynamic classifier to detect user voice activity, in accordance with some examples of the present disclosure.
Figure 9:
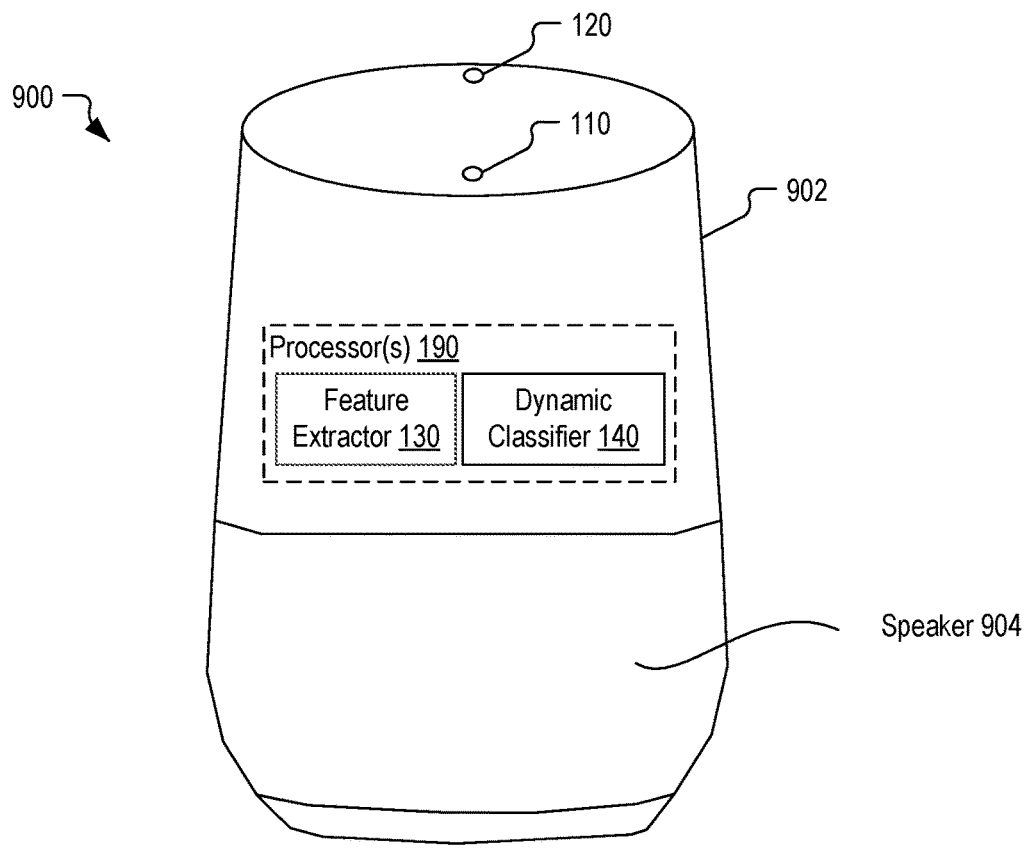
FIG. 9 is a diagram of a voice-controlled speaker system that includes a dynamic classifier to detect user voice activity, in accordance with some examples of the present disclosure.
Figure 10:
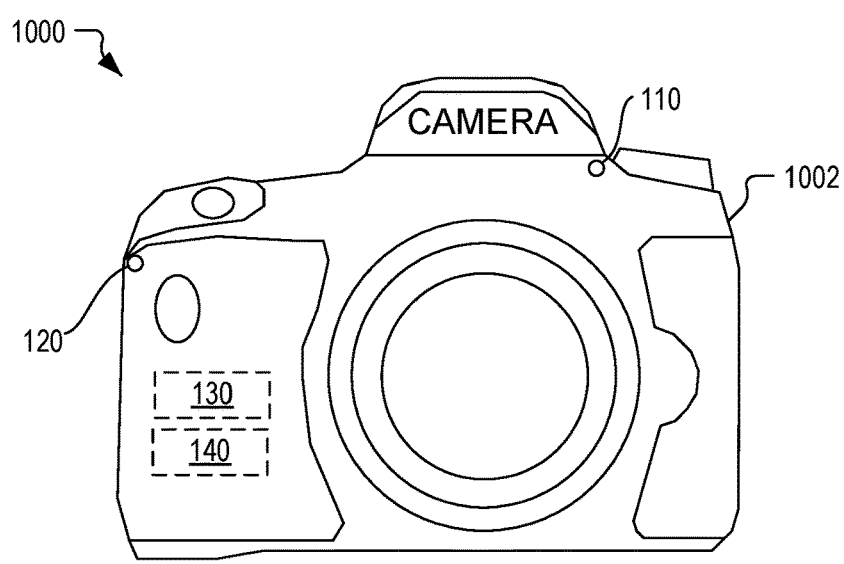
FIG. 10 is a diagram of a camera that includes a dynamic classifier to detect user voice activity, in accordance with some examples of the present disclosure.
Figure 11:
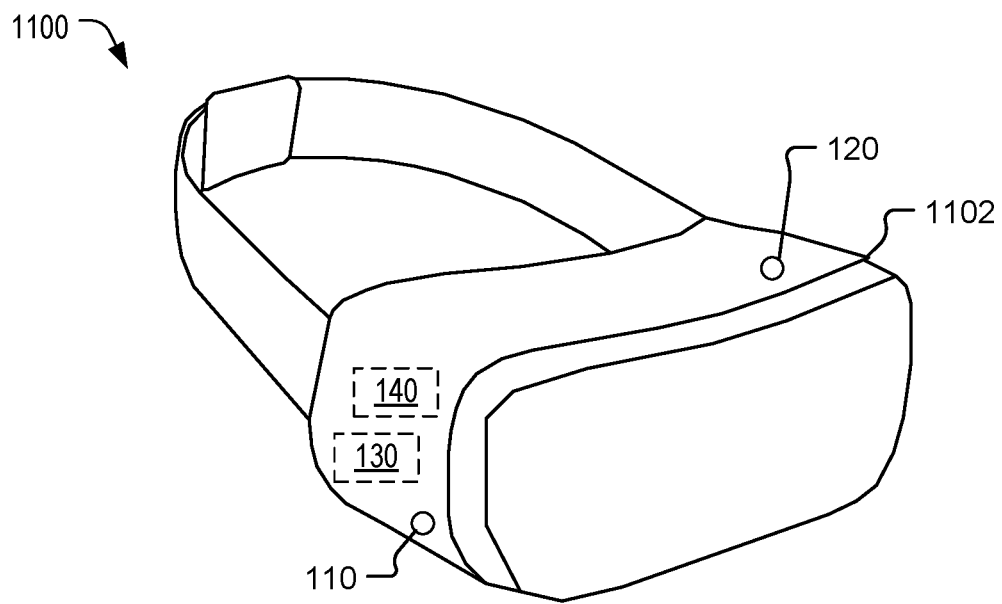
FIG. 11 is a diagram of a headset, such as a virtual reality or augmented reality headset, that includes a dynamic classifier to detect user voice activity, in accordance with some examples of the present disclosure.
Figure 12:
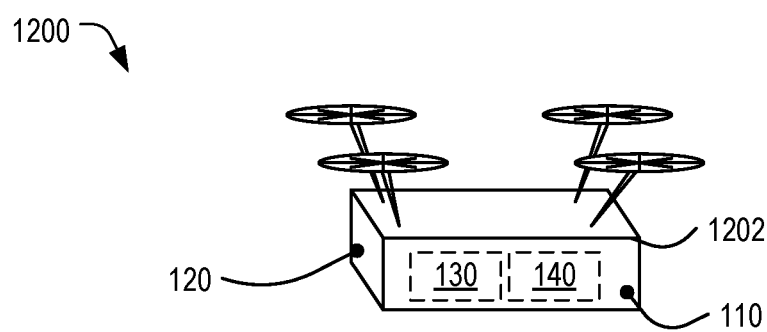
FIG. 12 is a diagram of a first example of a vehicle that includes a dynamic classifier to detect user voice activity, in accordance with some examples of the present disclosure.
Figure 13:
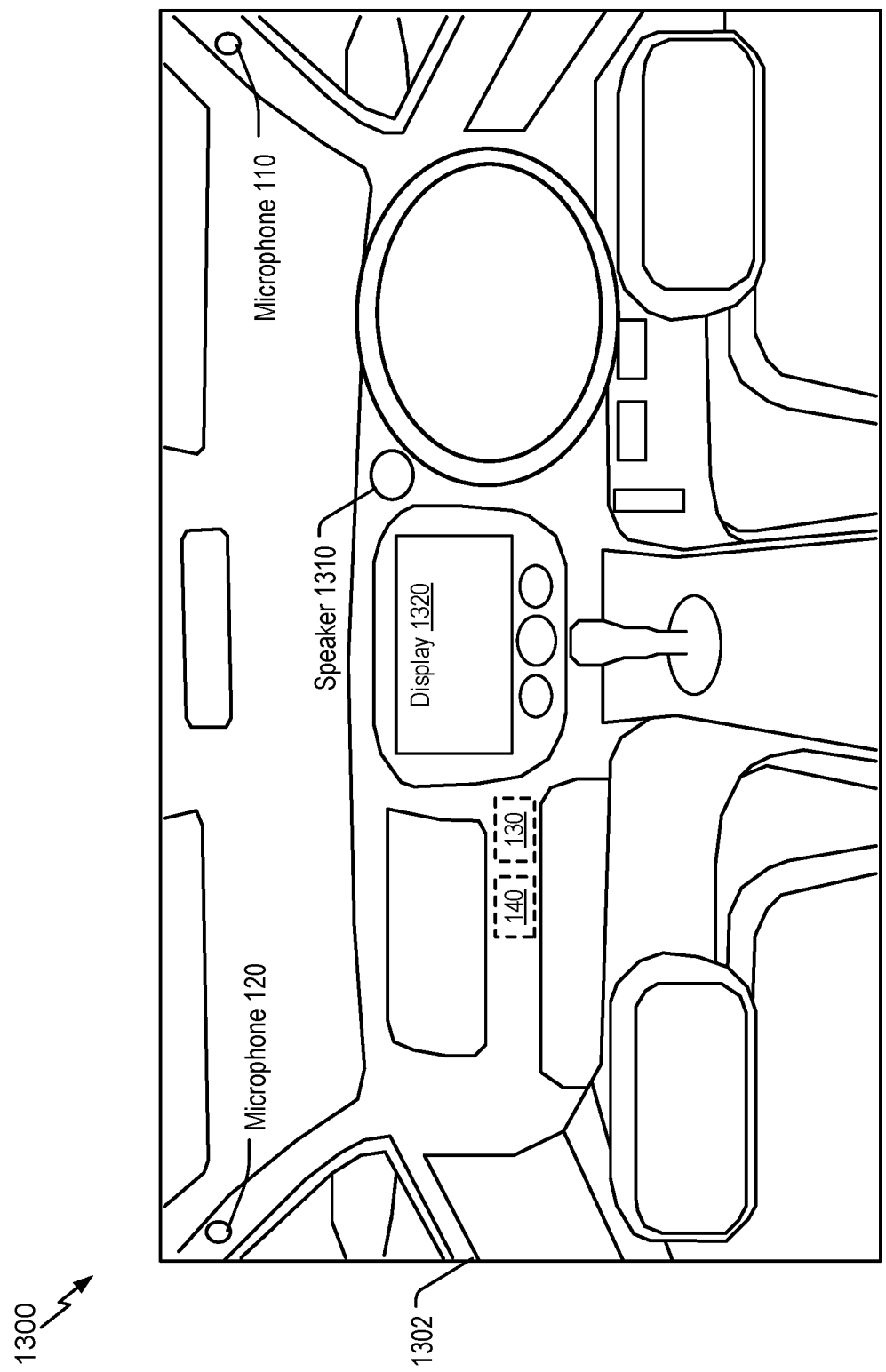
FIG. 13 is a diagram of a second example of a vehicle that includes a dynamic classifier to detect user voice activity, in accordance with some examples of the present disclosure.

FIG. 5 depicts an implementation 500 of the device 102 as an integrated circuit 502 that includes the one or more processors 190. The integrated circuit 502 also includes an audio input 504, such as one or more bus interfaces, to enable the audio data 128 to be received for processing. The integrated circuit 502 also includes a signal output 512, such as a bus interface, to enable sending of an output signal, such as the user voice activity indicator 150. The integrated circuit 502 enables implementation of self-voice activity detection as a component in a system that includes microphones, such as a mobile phone or tablet as depicted in FIG. 6, a headset as depicted in FIG. 7, a wearable electronic device as depicted in FIG. 8, a voice-controlled speaker system as depicted in FIG. 9, a camera as depicted in FIG. 10, a virtual reality headset, mixed reality headset, or an augmented reality headset as depicted in FIG. 11, or a vehicle as depicted in FIG. 12 or FIG. 13.

Figure 6:
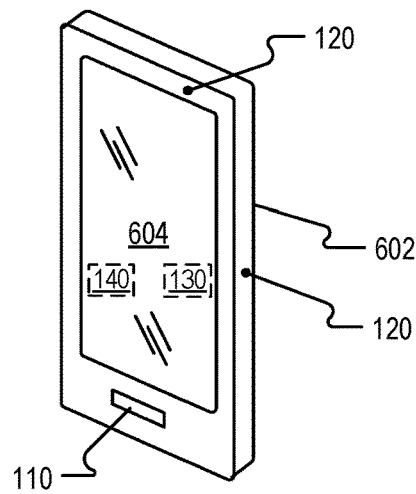
FIG. 6 is a diagram of a mobile device that includes a dynamic classifier to detect user voice activity, in accordance with some examples of the present disclosure.

FIG. 6 depicts an implementation 600 in which the device 102 is a mobile device 602, such as a phone or tablet, as illustrative, non-limiting examples. The mobile device 602 includes the first microphone 110 positioned to primarily capture speech of a user, multiple second microphones 120 positioned to primarily capture environmental sounds, and a display screen 604. Components of the processor 190, including the feature extractor 130 and the dynamic classifier 140, are integrated in the mobile device 602 and are illustrated using dashed lines to indicate internal components that are not generally visible to a user of the mobile device 602. Although the processor 190 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1. In a particular example, the dynamic classifier 140 operates to detect user voice activity, which is then processed to perform one or more operations at the mobile device 602, such as to launch a graphical user interface or otherwise display other information associated with the user's speech at the display screen 604 (e.g., via an integrated "smart assistant" application).

Figure 7:
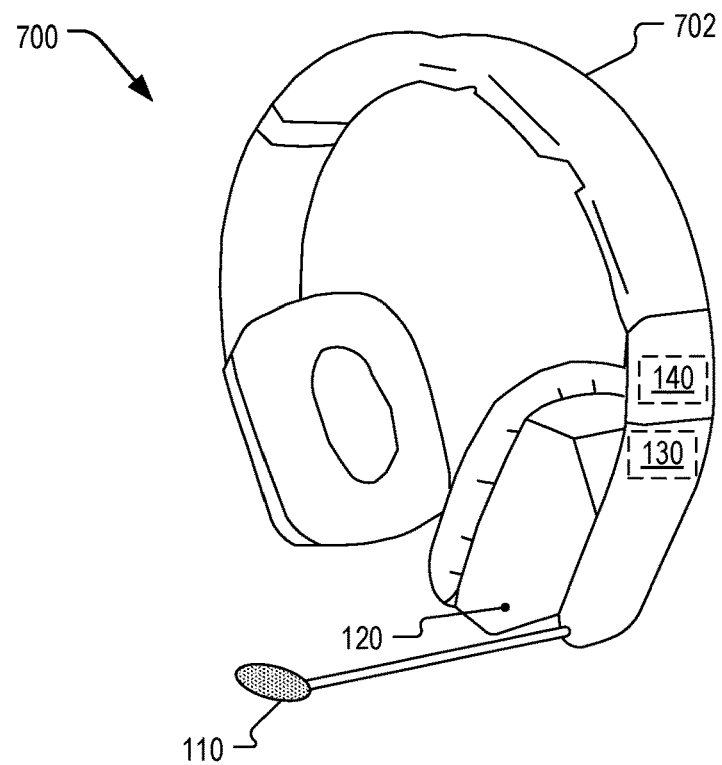
FIG. 7 is a diagram of a headset that includes a dynamic classifier to detect user voice activity, in accordance with some examples of the present disclosure.

FIG. 7 depicts an implementation 700 in which the device 102 is a headset device 702. The headset device 702 includes the first microphone 110 positioned to primarily capture speech of a user and the second microphone 120 positioned to primarily capture environmental sounds. Components of the processor 190, including the feature extractor 130 and the dynamic classifier 140, are integrated in the headset device 702. In a particular example, the dynamic classifier 140 operates to detect user voice activity, which may cause the headset device 702 to perform one or more operations at the headset device 702, to transmit audio data corresponding to the user voice activity to a second device (not shown), such as the second device 160 of FIG. 1, for further processing, or a combination thereof. Although the processor 190 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1.

Figure 8:
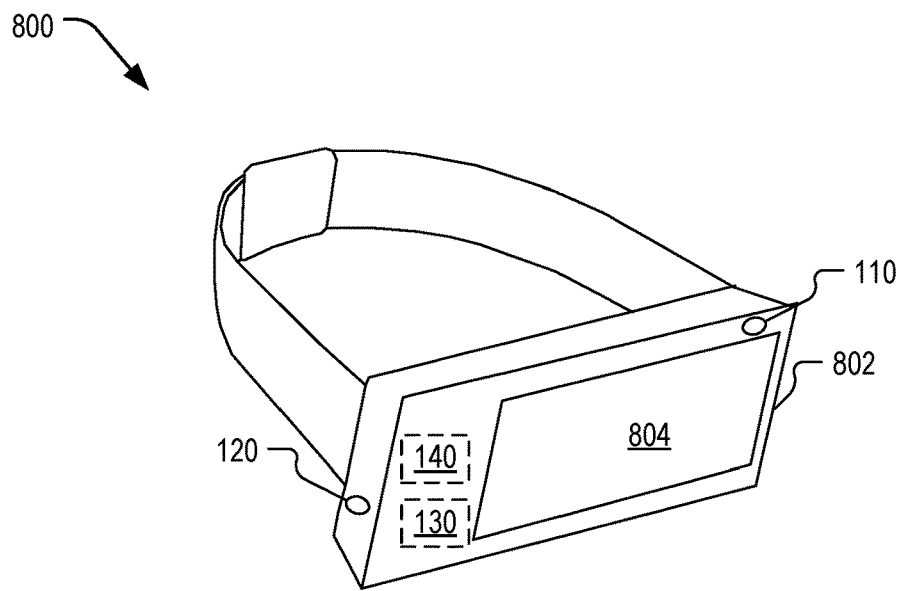
FIG. 8 is a diagram of a wearable electronic device that includes a dynamic classifier to detect user voice activity, in accordance with some examples of the present disclosure.

FIG. 8 depicts an implementation 800 in which the device 102 is a wearable electronic device 802, illustrated as a "smart watch." The feature extractor 130, the dynamic classifier 140, the first microphone 110, and the second microphone 120 are integrated into the wearable electronic device 802. In a particular example, the dynamic classifier 140 operates to detect user voice activity, which is then processed to perform one or more operations at the wearable electronic device 802, such as to launch a graphical user interface or otherwise display other information associated with the user's speech at a display screen 804 of the wearable electronic device 802. To illustrate, the wearable electronic device 802 may include a display screen that is configured to display a notification based on user speech detected by the wearable electronic device 802. In a particular example, the wearable electronic device 802 includes a haptic device that provides a haptic notification (e.g., vibrates) in response to detection of user voice activity. For example, the haptic notification can cause a user to look at the wearable electronic device 802 to see a displayed notification indicating detection of a keyword spoken by the user. The wearable electronic device 802 can thus alert a user with a hearing impairment or a user wearing a headset that the user's voice activity is detected. Although the wearable electronic device 802 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1.

FIG. 9 is an implementation 900 in which the device 102 is a wireless speaker and voice activated device 902. The wireless speaker and voice activated device 902 can have wireless network connectivity and is configured to execute an assistant operation. The processor 190 including the feature extractor 130 and the dynamic classifier 140, the first microphone 110, the second microphone 120, or a combination thereof, are included in the wireless speaker and voice activated device 902. Although the processor 190 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1. The wireless speaker and voice activated device 902 also includes a speaker 904. During operation, in response to receiving a verbal command identified as user speech via operation of the dynamic classifier 140, the wireless speaker and voice activated device 902 can execute assistant operations, such as via execution of the voice activation system 162 (e.g., an integrated assistant application). The assistant operations can include adjusting a temperature, playing music, turning on lights, etc. For example, the assistant operations are performed responsive to receiving a command after a keyword or key phrase (e.g., "hello assistant").

In an illustrative example, when the wireless speaker and voice activated device 902 is near a wall of a room (e.g., next to a window) and arranged such that the first microphone 110 is arranged closer to an interior of the room as compared to the second microphone 120 (e.g., the second microphone may be positioned closer to the wall or window than the first microphone 110), speech originating from the interior of the room can be identified as user voice activity, while sound originating from outside the room (e.g., a speech of a person on the other side of the wall or window) can be identified as other audio activity. Because multiple people may be in the room, the wireless speaker and voice activated device 902 may be configured to identify speech from any of the multiple people as user voice activity (e.g., there may be multiple "users" of the wireless speaker and voice activated device 902). To illustrate, the dynamic classifier 140 may be configured to recognize feature data corresponding to speech originating from within the room as "self-voice" even when the person speaking may be relatively distant (e.g., several meters) from the wireless speaker and voice activated device 902 and is closer to the first microphone 110 than to the second microphone 120. In some implementations in which speech is detected from multiple people in the room, the wireless speaker and voice activated device 902 (e.g., the dynamic classifier 140) may be configured to identify the speech from the person closest to the first microphone 110 as user voice activity (e.g., self-voice with the closest user).

FIG. 10 depicts an implementation 1000 in which the device 102 is a portable electronic device that corresponds to a camera device 1002. The feature extractor 130 and the dynamic classifier 140, the first microphone 110, the second microphone 120, or a combination thereof, are included in the camera device 1002. During operation, in response to receiving a verbal command identified as user speech via operation of the dynamic classifier 140, the camera device 1002 can execute operations responsive to spoken user commands, such as to adjust image or video capture settings, image or video playback settings, or image or video capture instructions, as illustrative examples. Although the camera device 1002 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1.

FIG. 11 depicts an implementation 1100 in which the device 102 includes a portable electronic device that corresponds to an extended reality ("XR") headset 1102, such as a virtual reality ("VR"), augmented reality ("AR"), or mixed reality ("MR") headset device. The feature extractor 130, the dynamic classifier 140, the first microphone 110, the second microphone 120, or a combination thereof, are integrated into the headset 1102. In a particular aspect, the headset 1102 includes the first microphone 110 positioned to primarily capture speech of a user and the second microphone 120 positioned to primarily capture environmental sounds. User voice activity detection can be performed based on audio signals received from the first microphone 110 and the second microphone 120 of the headset 1102. A visual interface device is positioned in front of the user's eyes to enable display of augmented reality or virtual reality images or scenes to the user while the headset 1102 is worn. In a particular example, the visual interface device is configured to display a notification indicating user speech detected in the audio signal. Although the headset 1102 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1.

FIG. 12 depicts an implementation 1200 in which the device 102 corresponds to or is integrated within a vehicle 1202, illustrated as a manned or unmanned aerial device (e.g., a package delivery drone). The feature extractor 130, the dynamic classifier 140, the first microphone 110, the second microphone 120, or a combination thereof, are integrated into the vehicle 1202. User voice activity detection can be performed based on audio signals received from the first microphone 110 and the second microphone 120 of the vehicle 1202, such as for delivery instructions from an authorized user of the vehicle 1202. Although the vehicle 1202 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1.

FIG. 13 depicts another implementation 1300 in which the device 102 corresponds to, or is integrated within, a vehicle 1302, illustrated as a car. The vehicle 1302 includes the processor 190 including the feature extractor 130 and the dynamic classifier 140. Although the vehicle 1302 is illustrated as including the feature extractor 130, in other implementations the feature extractor 130 is omitted, such as when the dynamic classifier 140 is configured to extract feature data during processing of the first audio data 116 and the second audio data 126, as described with reference to FIG. 1. The vehicle 1302 also includes the first microphone 110 and the second microphone 120. The first microphone 110 is positioned to capture utterances of an operator of the vehicle 1302. User voice activity detection can be performed based on audio signals received from the first microphone 110 and the second microphone 120 of the vehicle 1302. In some implementations, user voice activity detection can be performed based on an audio signal received from interior microphones (e.g., the first microphone 110 and the second microphone 120), such as for a voice command from an authorized passenger. For example, the user voice activity detection can be used to detect a voice command from an operator of the vehicle 1302 (e.g., from a parent to set a volume to 5 or to set a destination for a self-driving vehicle) and to disregard the voice of another passenger (e.g., a voice command from a child to set the volume to 10 or other passengers discussing another location). In some implementations, user voice activity detection can be performed based on an audio signal received from external microphones (e.g., the first microphone 110 and the second microphone 120), such as an authorized user of the vehicle. In a particular implementation, in response to receiving a verbal command identified as user speech via operation of the dynamic classifier 140, the voice activation system 162 initiates one or more operations of the vehicle 1302 based on one or more keywords (e.g., "unlock", "start engine", "play music", "display weather forecast", or another voice command) detected in the output signal 135, such as by providing feedback or information via a display 1320 or one or more speakers (e.g., a speaker 1310).

Figure 14A:
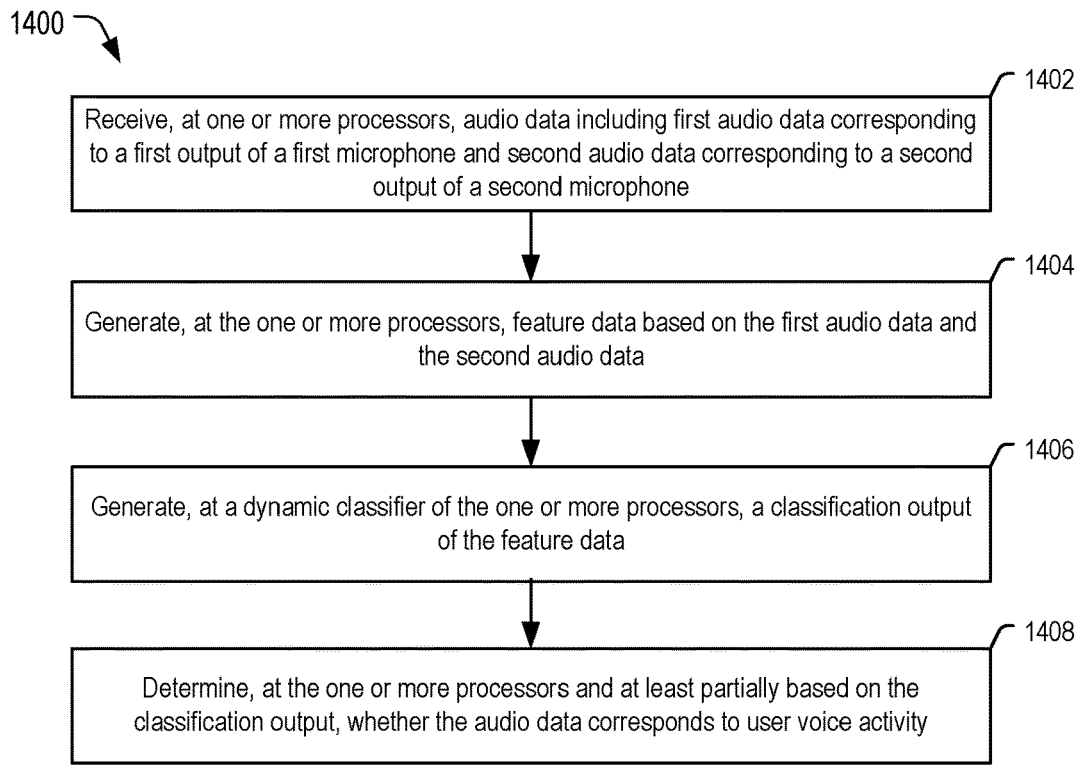
FIG. 14A is diagram of a particular implementation of a method of self-voice activity detection that may be performed by the device of FIG. 1, in accordance with some examples of the present disclosure.

Referring to FIG. 14A, a particular implementation of a method 1400 of user voice activity detection is shown. In a particular aspect, one or more operations of the method 1400 are performed by at least one of the feature extractor 130, the dynamic classifier 140, the processor 190, the device 102, the system 100 of FIG. 1, or a combination thereof.

The method 1400 includes receiving, at one or more processors, audio data including first audio data corresponding to a first output of a first microphone and second audio data corresponding to a second output of a second microphone, at 1402. For example, the feature extractor 130 of FIG. 1 receives the audio data 128 including the first audio data 116 corresponding to a first output of the first microphone 110 and the second audio data 126 corresponding to a second output of the second microphone 126, as described with reference to FIG. 1.

The method 1400 includes generating, at the one or more processors, feature data based on the first audio data and the second audio data, at 1404. For example, the feature extractor 130 of FIG. 1 generates the feature data 132 based on the first audio data 116 and the second audio data 126, as described with reference to FIG. 1. In another example, a dynamic classifier, such as the dynamic classifier 140 of FIG. 1, is configured to receive the first audio data 116 and the second audio data 126 and to extract the feature data 132 during processing of the first audio data 116 and the second audio data 126.

The method 1400 includes generating, at a dynamic classifier of the one or more processors, a classification output of the feature data, at 1406. For example, the dynamic classifier 140 of FIG. 1 generates the classification output 142 of the feature data 132, as described with reference to FIG. 1.

The method 1400 includes determining, at the one or more processors and at least partially based on the classification output, whether the audio data corresponds to user voice activity, at 1408. For example, the processor 190 of FIG. 1 determines, at least partially based on the classification output 142, whether the audio data 128 corresponds to user voice activity, as described with reference to FIG. 1.

The method 1400 improves performance of self-voice activity detection by using the dynamic classifier 140 to discriminate between user voice activity and other audio activity with relatively low complexity, low power consumption, and high accuracy as compared to conventional self-voice activity detection techniques. Automatically adapting to user and environment changes provides improved benefit by reducing or eliminating calibration to be performed by the user and enhancing the user's experience.

Figure 14B:
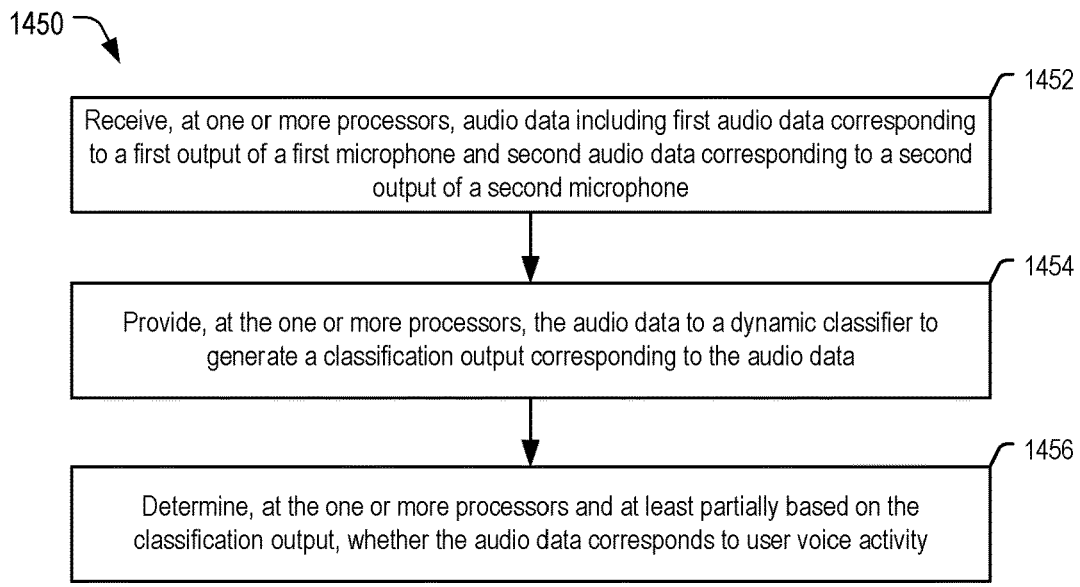
FIG. 14B is diagram of another particular implementation of a method of self-voice activity detection that may be performed by the device of FIG. 1, in accordance with some examples of the present disclosure.

Referring to FIG. 14B, a particular implementation of a method 1450 of user voice activity detection is shown. In a particular aspect, one or more operations of the method 1450 are performed by at least one of the dynamic classifier 140, the processor 190, the device 102, the system 100 of FIG. 1, or a combination thereof.

The method 1450 includes receiving, at one or more processors, audio data including first audio data corresponding to a first output of a first microphone and second audio data corresponding to a second output of a second microphone, at 1452. In an example, the feature extractor 130 of FIG. 1 receives the audio data 128, including the first audio data 116 and the second audio data 126 corresponding to a second output of the second microphone 126, as described with reference to FIG. 1.

The method 1450 includes providing, at the one or more processors, the audio data to a dynamic classifier to generate a classification output corresponding to the audio data, at 1454. In an example, the feature extractor 130 of FIG. 1 generates the feature data 132 based on the first audio data 116 and the second audio data 126, and the feature data 132 is processed by the dynamic classifier 140 to generate the classification output 142, such as described in FIG. 1 and in accordance with the method 1400 of FIG. 14A. In another example, the processor 190 provides the first audio data 116 and the second audio data 126 to the dynamic classifier 140, and the dynamic classifier 140 processes the first audio data 116 and the second audio data 126 to generate the classification output 142. In an illustrative implementation, the dynamic classifier 140 processes the first audio data 116 and the second audio data 126 to extract the feature data 132, and determines the classification output 142 based on the feature data 132.

The method 1450 includes determining, at the one or more processors and at least partially based on the classification output, whether the audio data corresponds to user voice activity, at 1456. For example, the processor 190 of FIG. 1 determines, at least partially based on the classification output 142, whether the audio data 128 corresponds to user voice activity, as described with reference to FIG. 1.

The method 1450 improves performance of self-voice activity detection by using the dynamic classifier 140 to discriminate between user voice activity and other audio activity with relatively low complexity, low power consumption, and high accuracy as compared to conventional self-voice activity detection techniques. Automatically adapting to user and environment changes provides improved benefit by reducing or eliminating calibration to be performed by the user and enhancing the user's experience.

The method 1400 of FIG. 14A, the method 1450 of FIG. 14B, or a combination thereof, may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1400 of FIG. 14A, the method 1450 of FIG. 14B, or a combination thereof, may be performed by a processor that executes instructions, such as described with reference to FIG. 15.

Figure 15:
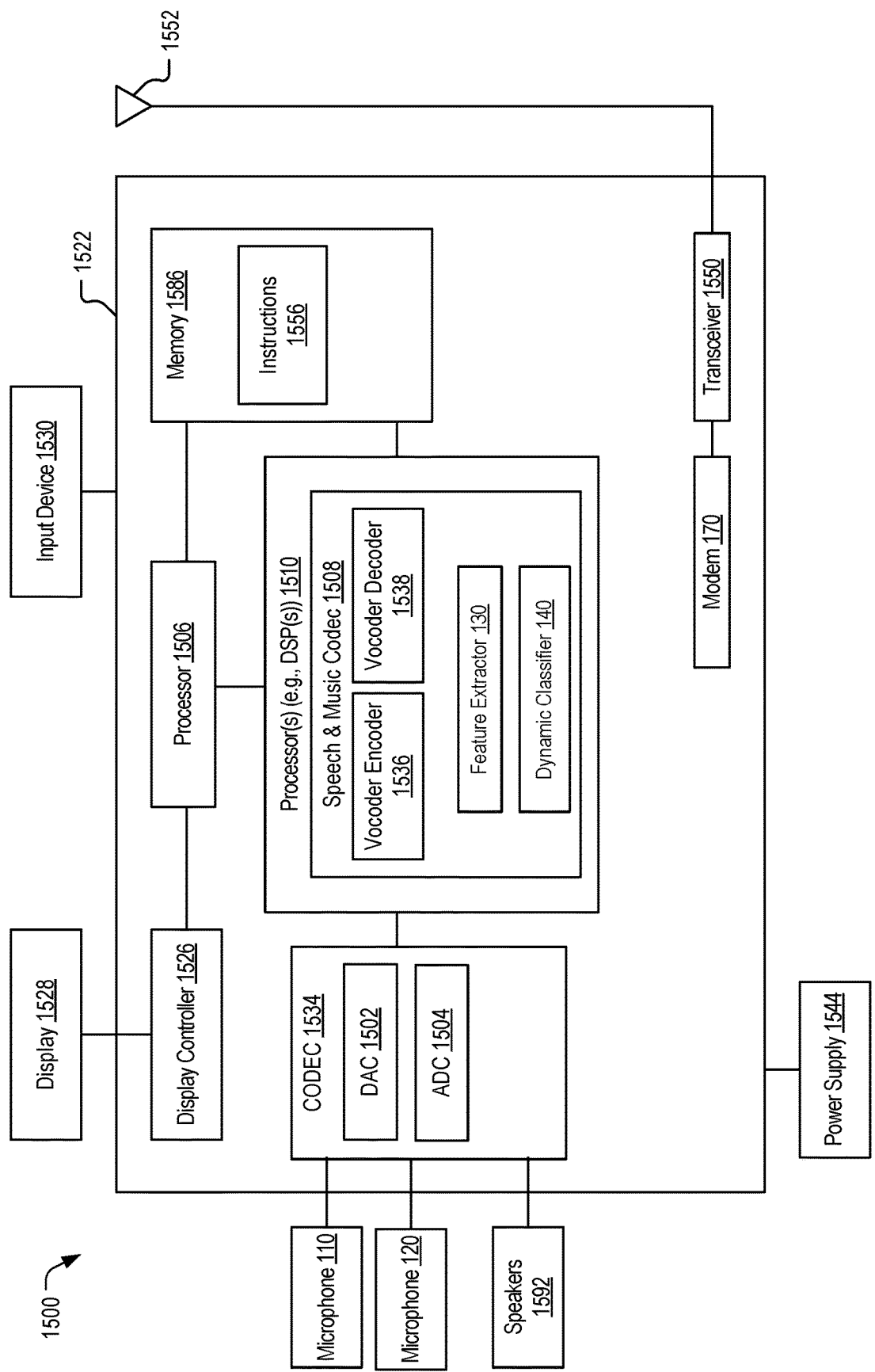
FIG. 15 is a block diagram of a particular illustrative example of a device that is operable to perform self-voice activity detection, in accordance with some examples of the present disclosure.

Referring to FIG. 15, a block diagram of a particular illustrative implementation of a device is depicted and generally designated 1500. In various implementations, the device 1500 may have more or fewer components than illustrated in FIG. 15. In an illustrative implementation, the device 1500 may correspond to the device 102. In an illustrative implementation, the device 1500 may perform one or more operations described with reference to FIGS. 1-14B.

In a particular implementation, the device 1500 includes a processor 1506 (e.g., a central processing unit (CPU)). The device 1500 may include one or more additional processors 1510 (e.g., one or more DSPs). In a particular aspect, the processor 190 of FIG. 1 corresponds to the processor 1506, the processors 1510, or a combination thereof. The processors 1510 may include a speech and music coder-decoder (CODEC) 1508 that includes a voice coder ("vocoder") encoder 1536, a vocoder decoder 1538, the feature extractor 130, the dynamic classifier 140, or a combination thereof.

The device 1500 may include a memory 1586 and a CODEC 1534. The memory 1586 may include instructions 1556, that are executable by the one or more additional processors 1510 (or the processor 1506) to implement the functionality described with reference to the feature extractor 130, the dynamic classifier 140, or both. The device 1500 may include the modem 170 coupled, via a transceiver 1550, to an antenna 1552.

The device 1500 may include a display 1528 coupled to a display controller 1526. A speaker 1592, the first microphone 110, and the second microphone 120 may be coupled to the CODEC 1534. The CODEC 1534 may include a digital-to-analog converter (DAC) 1502, an analog-to-digital converter (ADC) 1504, or both. In a particular implementation, the CODEC 1534 may receive analog signals from the first microphone 110 and the second microphone 120, convert the analog signals to digital signals using the analog-to-digital converter 1504, and provide the digital signals to the speech and music codec 1508. The speech and music codec 1508 may process the digital signals, and the digital signals may further be processed by the feature extractor 130 and the dynamic classifier 140. In a particular implementation, the speech and music codec 1508 may provide digital signals to the CODEC 1534. The CODEC 1534 may convert the digital signals to analog signals using the digital-to-analog converter 1502 and may provide the analog signals to the speaker 1592.

In a particular implementation, the device 1500 may be included in a system-in-package or system-on-chip device 1522. In a particular implementation, the memory 1586, the processor 1506, the processors 1510, the display controller 1526, the CODEC 1534, and the modem 170 are included in a system-in-package or system-on-chip device 1522. In a particular implementation, an input device 1530 and a power supply 1544 are coupled to the system-on-chip device 1522. Moreover, in a particular implementation, as illustrated in FIG. 15, the display 1528, the input device 1530, the speaker 1592, the first microphone 110, the second microphone 120, the antenna 1552, and the power supply 1544 are external to the system-on-chip device 1522. In a particular implementation, each of the display 1528, the input device 1530, the speaker 1592, the first microphone 110, the second microphone 120, the antenna 1552, and the power supply 1544 may be coupled to a component of the system-on-chip device 1522, such as an interface (e.g., the first input interface 114 or the second input interface 124) or a controller.

The device 1500 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a vehicle, a computing device, a communication device, an internet-of-things (IoT) device, a virtual reality (VR) device, a base station, a mobile device, or any combination thereof.

In conjunction with the described implementations, an apparatus includes means for receiving audio data including first audio data corresponding to a first output of a first microphone and second audio data corresponding to a second output of a second microphone. For example, the means for receiving can correspond to the first input interface 114, the second input interface 124, the feature extractor 130, the dynamic classifier 140, the processor 190, the one or more processors 1510, one or more other circuits or components configured to receive audio data including first audio data corresponding to a first output of a first microphone and second audio data corresponding to a second output of a second microphone, or any combination thereof.

The apparatus also includes means for generating feature data based on the first audio data and the second audio data. For example, the means for generating the feature data can correspond to the feature extractor 130, the dynamic classifier 140, the processor 190, the one or more processors 1510, one or more other circuits or components configured to generate feature data, or any combination thereof.

The apparatus further includes means for generating, at a dynamic classifier, a classification output of the feature data. For example, the means for generating the classification output can correspond to the dynamic classifier 140, the processor 190, the one or more processors 1510, one or more other circuits or components configured to generate classification output at a dynamic classifier, or any combination thereof.

The apparatus also includes means for determining, at least partially based on the classification output, whether the audio data corresponds to user voice activity. For example, the means for determining can correspond to the dynamic classifier 140, the processor 190, the one or more processors 1510, one or more other circuits or components configured to determine, at least partially based on the classification output, whether the audio data corresponds to user voice activity, or any combination thereof In conjunction with the described implementations, an apparatus includes means for receiving audio data including first audio data corresponding to a first output of a first microphone and second audio data corresponding to a second output of a second microphone. For example, the means for receiving can correspond to the first input interface 114, the second input interface 124, the feature extractor 130, the dynamic classifier 140, the processor 190, the one or more processors 1510, one or more other circuits or components configured to receive audio data including first audio data corresponding to a first output of a first microphone and second audio data corresponding to a second output of a second microphone, or any combination thereof.

The apparatus further includes means for generating, at a dynamic classifier, a classification output corresponding to the audio data. For example, the means for generating the classification output can correspond to the feature extractor 130, the dynamic classifier 140, the processor 190, the one or more processors 1510, one or more other circuits or components configured to generate classification output at a dynamic classifier, or any combination thereof.

The apparatus also includes means for determining, at least partially based on the classification output, whether the audio data corresponds to user voice activity. For example, the means for determining can correspond to the dynamic classifier 140, the processor 190, the one or more processors 1510, one or more other circuits or components configured to determine, at least partially based on the classification output, whether the audio data corresponds to user voice activity, or any combination thereof.

In some implementations, a non-transitory computer-readable medium (e.g., a computer-readable storage device, such as the memory 1586) includes instructions (e.g., the instructions 1556) that, when executed by one or more processors (e.g., the one or more processors 1510 or the processor 1506), cause the one or more processors to receive audio data (e.g., the audio data 128) including first audio data (e.g., the first audio data 116) corresponding to a first output of a first microphone (e.g., the first microphone 110) and second audio data (e.g., the second audio data 126) corresponding to a second output of a second microphone (e.g., the second microphone 120). The instructions, when executed by the one or more processors, also cause the one or more processors to provide the audio data to a dynamic classifier (e.g., the dynamic classifier 140) to generate a classification output (e.g., the classification output 142) corresponding to the audio data. In an example, the instructions, when executed by the one or more processors, cause the one or more processors to generate feature data (e.g., the feature data 132) based on the first audio data and the second audio data and to process the feature data at the dynamic classifier. The instructions, when executed by the one or more processors, also cause the one or more processors to determine, at least partially based on the classification output, whether the audio data corresponds to user voice activity.

This disclosure includes the following examples.

Example 1. A device comprising: one or more processors configured to: receive audio data including first audio data corresponding to a first output of a first microphone and second audio data corresponding to a second output of a second microphone; generate feature data based on the first audio data and the second audio data; process the feature data at a dynamic classifier to generate a classification output of the feature data; and determine, at least partially based on the classification output, whether the audio data corresponds to user voice activity.

Example 2. The device of example 1, further comprising the first microphone and the second microphone, wherein the first microphone is coupled to the one or more processors and configured to capture utterances of a user, and wherein the second microphone is coupled to the one or more processors and configured to capture ambient sound.

Example 3. The device of example 1, wherein the feature data includes: at least one interaural phase difference between the first audio data and the second audio data; and at least one interaural intensity difference between the first audio data and the second audio data.

Example 4. The device of example 3, wherein the one or more processors are further configured to transform the first audio data and the second audio data to a transform domain prior to generating the feature data, and wherein the feature data includes interaural phase differences for multiple frequencies and interaural intensity differences for multiple frequencies.

Example 5. The device of example 1, wherein the dynamic classifier is configured to adaptively cluster sets of feature data based on whether a sound represented in the audio data originates from a source that is closer to the first microphone than to the second microphone.

Example 6. The device of example 1, wherein the one or more processors are further configured to update a clustering operation of the dynamic classifier based on the feature data.

Example 7. The device of example 1, wherein the one or more processors are further configured to update a classification decision criterion of the dynamic classifier.

Example 8. The device of example 1, wherein the dynamic classifier includes a self-organizing map.

Example 9. The device of example 1, wherein the dynamic classifier is further configured to receive a sequence of sets of feature data and to adaptively cluster a set of the sequence at least partially based on a prior set of feature data in the sequence.

Example 10. The device of example 1, wherein the one or more processors are configured to determine whether the audio data corresponds to the user voice activity further based on at least one of a sign or a magnitude of at least one value of the feature data.

Example 11. The device of example 1, wherein the one or more processors are further configured to initiate a voice command processing operation in response to a determination that the audio data corresponds to the user voice activity.

Example 12. The device of example 11, wherein the one or more processors are configured to generate at least one of a wakeup signal or an interrupt to initiate the voice command processing operation.

Example 13. The device of example 12, wherein the one or more processors further include: an always-on power domain that includes the dynamic classifier; and a second power domain that includes a voice command processing unit, and wherein the wakeup signal is configured to transition the second power domain from a low-power mode to activate the voice command processing unit.

Example 14. The device of example 1, further comprising a modem coupled to the one or more processors, the modem configured to transmit the audio data to a second device in response to a determination that the audio data corresponds to the user voice activity based on the dynamic classifier.

Example 15. The device of example 1, wherein the one or more processors are integrated in a headset device that includes the first microphone and the second microphone, and wherein the headset device is configured, when worn by a user, to position the first microphone closer than the second microphone to the user's mouth to capture utterances of the user at the first microphone with greater intensity and less delay as compared to at the second microphone.

Example 16. The device of example 1, wherein the one or more processors are integrated in at least one of a mobile phone, a tablet computer device, a wearable electronic device, a camera device, a virtual reality headset, or an augmented reality headset.

Example 17. The device of example 1, wherein the one or more processors are integrated in a vehicle, the vehicle further including the first microphone and the second microphone, and wherein the first microphone is positioned to capture utterances of an operator of the vehicle.

Example 18. A method of voice activity detection comprising: receiving, at one or more processors, audio data including first audio data corresponding to a first output of a first microphone and second audio data corresponding to a second output of a second microphone; generating, at the one or more processors, feature data based on the first audio data and the second audio data; generating, at a dynamic classifier of the one or more processors, a classification output of the feature data; and determining, at the one or more processors and at least partially based on the classification output, whether the audio data corresponds to user voice activity.

Example 19. The method of example 18, wherein the first microphone is configured to capture utterances of a user, and wherein the second microphone is configured to capture ambient sound.

Example 20. The method of example 18, wherein the feature data includes: at least one interaural phase difference between the first audio data and the second audio data; and at least one interaural intensity difference between the first audio data and the second audio data.

Example 21. The method of example 20, further comprising transforming the first audio data and the second audio data to a transform domain prior to generating the feature data, wherein the feature data includes interaural phase differences for multiple frequencies and interaural intensity differences for multiple frequencies.

Example 22. The method of example 18, further comprising adaptively clustering, by the dynamic classifier, sets of feature data based on whether a sound represented in the audio data originates from a source that is closer to the first microphone than to the second microphone.

Example 23. The method of example 18, further comprising updating a clustering operation of the dynamic classifier based on the feature data.

Example 24. The method of example 18, further comprising updating a classification decision criterion of the dynamic classifier.

Example 25. The method of example 18, wherein the dynamic classifier includes a self-organizing map.

Example 26. The method of example 18, further comprising receiving, at the dynamic classifier, a sequence of sets of feature data and adaptively clustering a set of the sequence at least partially based on a prior set of feature data in the sequence.

Example 27. The method of example 18, wherein determining whether the audio data corresponds to the user voice activity is further based on at least one of a sign or a magnitude of at least one value of the feature data.

Example 28. The method of example 18, further comprising initiating a voice command processing operation in response to a determination that the audio data corresponds to the user voice activity.

Example 29. The method of example 28, further comprising generating at least one of a wakeup signal or an interrupt to initiate the voice command processing operation.

Example 30. The method of example 29, wherein the wakeup signal is configured to transition a power domain from a low-power mode to initiate the voice command processing operation.

Example 31. The method of example 18, further comprising transmitting the audio data to a second device in response to a determination that the audio data corresponds to the user voice activity based on the dynamic classifier.

Example 32. The method of example 18, wherein the one or more processors are integrated in a headset device that includes the first microphone and the second microphone, and wherein the headset device, when worn by a user, positions the first microphone closer than the second microphone to the user's mouth to capture utterances of the user at the first microphone with greater intensity and less delay as compared to at the second microphone.

Example 33. The method of example 18, wherein the one or more processors are integrated in at least one of a mobile phone, a tablet computer device, a wearable electronic device, a camera device, a virtual reality headset, an augmented reality headset, or a vehicle.

Example 34. A non-transitory computer-readable medium comprising instructions that, when executed by one or more processors, cause the one or more processors to: receive audio data including first audio data corresponding to a first output of a first microphone and second audio data corresponding to a second output of a second microphone; generate feature data based on the first audio data and the second audio data; process the feature data at a dynamic classifier to generate a classification output of the feature data; and determine, at least partially based on the classification output, whether the audio data corresponds to user voice activity.

Example 35. The non-transitory computer-readable medium of example 34, wherein the first microphone is configured to capture utterances of a user, and wherein the second microphone is configured to capture ambient sound.

Example 36. The non-transitory computer-readable medium of example 34, wherein the feature data includes: at least one interaural phase difference between the first audio data and the second audio data; and at least one interaural intensity difference between the first audio data and the second audio data.

Example 37. The non-transitory computer-readable medium of example 34, wherein the instructions, when executed by the one or more processors, further cause the one or more processors to transform the first audio data and the second audio data to a transform domain prior to generating the feature data, and wherein the feature data includes interaural phase differences for multiple frequencies and interaural intensity differences for multiple frequencies.

Example 38. The non-transitory computer-readable medium of example 34, wherein the instructions, when executed by the one or more processors, further cause the one or more processors to adaptively cluster, by the dynamic classifier, sets of feature data based on whether a sound represented in the audio data originates from a source that is closer to the first microphone than to the second microphone.

Example 39. The non-transitory computer-readable medium of example 34, wherein the instructions, when executed by the one or more processors, further cause the one or more processors to update a clustering operation of the dynamic classifier based on the feature data.

Example 40. The non-transitory computer-readable medium of example 34, wherein the instructions, when executed by the one or more processors, further cause the one or more processors to update a classification decision criterion of the dynamic classifier.

Example 41. The non-transitory computer-readable medium of example 34, wherein the dynamic classifier includes a self-organizing map.

Example 42. The non-transitory computer-readable medium of example 34, wherein the instructions, when executed by the one or more processors, further cause the one or more processors to receive, at the dynamic classifier, a sequence of sets of feature data and to adaptively cluster a set of the sequence at least partially based on a prior set of feature data in the sequence.

Example 43. The non-transitory computer-readable medium of example 34, wherein determining whether the audio data corresponds to the user voice activity is further based on at least one of a sign or a magnitude of at least one value of the feature data.

Example 44. The non-transitory computer-readable medium of example 34, wherein the instructions, when executed by the one or more processors, further cause the one or more processors to initiate a voice command processing operation in response to a determination that the audio data corresponds to the user voice activity.

Example 45. The non-transitory computer-readable medium of example 34, wherein the instructions, when executed by the one or more processors, further cause the one or more processors to generate at least one of a wakeup signal or an interrupt to initiate a voice command processing operation.

Example 46. The non-transitory computer-readable medium of example 45, wherein the wakeup signal is configured to transition a power domain from a low-power mode to initiate the voice command processing operation.

Example 47. The non-transitory computer-readable medium of example 34, wherein the instructions, when executed by the one or more processors, further cause the one or more processors to transmit the audio data to a second device in response to a determination that the audio data corresponds to the user voice activity based on the dynamic classifier.

Example 48. The non-transitory computer-readable medium of example 34, wherein the one or more processors are integrated in a headset device that includes the first microphone and the second microphone, and wherein the headset device, when worn by a user, positions the first microphone closer than the second microphone to the user's mouth to capture utterances of the user at the first microphone with greater intensity and less delay as compared to at the second microphone.

Example 49. The non-transitory computer-readable medium of example 34, wherein the one or more processors are integrated in at least one of a mobile phone, a tablet computer device, a wearable electronic device, a camera device, a virtual reality headset, an augmented reality headset, or a vehicle.

Example 50. An apparatus comprising: means for receiving audio data including first audio data corresponding to a first output of a first microphone and second audio data corresponding to a second output of a second microphone; means for generating feature data based on the first audio data and the second audio data; means for generating, at a dynamic classifier, a classification output of the feature data; and means for determining, at least partially based on the classification output, whether the audio data corresponds to user voice activity.

Example 51. The apparatus of example 50, wherein the feature data includes: at least one interaural phase difference between the first audio data and the second audio data; and at least one interaural intensity difference between the first audio data and the second audio data.

Example 52. The apparatus of example 50, further comprising means for transforming the first audio data and the second audio data to a transform domain prior to generation of the feature data, and wherein the feature data includes interaural phase differences for multiple frequencies and interaural intensity differences for multiple frequencies.

Example 53. The apparatus of example 50, further comprising means for adaptively clustering sets of feature data based on whether a sound represented in the audio data originates from a source that is closer to the first microphone than to the second microphone.

Example 54. The apparatus of example 50, further comprising means for updating a clustering operation of the dynamic classifier based on the feature data.

Example 55. The apparatus of example 50, further comprising means for updating a classification decision criterion of the dynamic classifier.

Example 56. The apparatus of example 50, wherein the dynamic classifier includes a self-organizing map.

Example 57. The apparatus of example 50, further comprising means for initiating a voice command processing operation in response to a determination that the audio data corresponds to the user voice activity.

Example 58. The apparatus of example 50, further comprising means for generating at least one of a wakeup signal or an interrupt to initiate a voice command processing operation.

Example 59. The apparatus of example 50, further comprising means for transmitting the audio data to a second device in response to a determination that the audio data corresponds to the user voice activity based on the dynamic classifier.

Example 60. The apparatus of example 50, wherein the means for receiving the audio data, the means for generating the feature data, the means for generating the classification output, and the means for determining whether the audio data corresponds to the user voice activity are integrated in a headset device that includes the first microphone and the second microphone, and wherein the headset device, when worn by a user, positions the first microphone closer than the second microphone to the user's mouth to capture utterances of the user at the first microphone with greater intensity and less delay as compared to at the second microphone.

Example 61. The apparatus of example 50, wherein the means for receiving the audio data, the means for generating the feature data, the means for generating the classification output, and the means for determining whether the audio data corresponds to user voice activity are integrated in at least one of a mobile phone, a tablet computer device, a wearable electronic device, a camera device, a virtual reality headset, an augmented reality headset, or a vehicle.

Example 62. A device including: a memory configured to store instructions; and one or more processors configured execute the instructions to: receive audio data including first audio data corresponding to a first output of a first microphone and second audio data corresponding to a second output of a second microphone; provide the audio data to a dynamic classifier, the dynamic classifier configured to generate a classification output corresponding to the audio data; and determine, at least partially based on the classification output, whether the audio data corresponds to user voice activity.

Example 63. The device of example 62, further including the first microphone and the second microphone, wherein the first microphone is coupled to the one or more processors and configured to capture utterances of a user, and wherein the second microphone is coupled to the one or more processors and configured to capture ambient sound.

Example 64. The device of example 62 or 63, wherein the classification output is based on a gain difference between the first audio data and the second audio data, a phase difference between the first audio data and the second audio data, or a combination thereof.

Example 65. The device of any of examples 62 to 64, wherein the one or more processors are further configured to: generate feature data based on the first audio data and the second audio data; and provide the feature data to the dynamic classifier, wherein the classification output is based on the feature data.

Example 66. The device of example 65, wherein the feature data includes: at least one interaural phase difference between the first audio data and the second audio data; and at least one interaural intensity difference between the first audio data and the second audio data.

Example 67. The device of example 65 or 66, wherein the one or more processors are configured to determine whether the audio data corresponds to the user voice activity further based on at least one of a sign or a magnitude of at least one value of the feature data.

Example 68. The device of any of examples 65 to 67, wherein the one or more processors are further configured to transform the first audio data and the second audio data to a transform domain prior to generating the feature data, and wherein the feature data includes interaural phase differences for multiple frequencies and interaural intensity differences for multiple frequencies.

Example 69. The device of any of examples 65 to 68, wherein the dynamic classifier is configured to adaptively cluster sets of feature data based on whether a sound represented in the audio data originates from a source that is closer to the first microphone than to the second microphone.

Example 70. The device of any of examples 62 to 69, wherein the one or more processors are further configured to update a clustering operation of the dynamic classifier based on the audio data.

Example 71. The device of any of examples 62 to 70, wherein the one or more processors are further configured to update a classification decision criterion of the dynamic classifier.

Example 72. The device of any of examples 62 to 71, wherein the dynamic classifier includes a self-organizing map.

Example 73. The device of any of examples 62 to 72, wherein the dynamic classifier is further configured to receive a sequence of sets of audio data and to adaptively cluster a set of the sequence at least partially based on a prior set of audio data in the sequence.

Example 74. The device of any of examples 62 to 73, wherein the one or more processors are further configured to initiate a voice command processing operation in response to a determination that the audio data corresponds to the user voice activity.

Example 75. The device of example 74, wherein the one or more processors are configured to generate at least one of a wakeup signal or an interrupt to initiate the voice command processing operation.

Example 76. The device of example 75, wherein the one or more processors further include: an always-on power domain that includes the dynamic classifier; and a second power domain that includes a voice command processing unit, and wherein the wakeup signal is configured to transition the second power domain from a low-power mode to activate the voice command processing unit.

Example 77. The device of any of examples 62 to 76, further comprising a modem coupled to the one or more processors, the modem configured to transmit the audio data to a second device in response to a determination that the audio data corresponds to the user voice activity based on the dynamic classifier.

Example 78. The device of any of examples 62 to 77, wherein the one or more processors are integrated in a headset device that includes the first microphone and the second microphone, and wherein the headset device is configured, when worn by a user, to position the first microphone closer than the second microphone to the user's mouth to capture utterances of the user at the first microphone with greater intensity and less delay as compared to at the second microphone.

Example 79. The device of any of examples 62 to 77, wherein the one or more processors are integrated in at least one of a mobile phone, a tablet computer device, a wearable electronic device, a camera device, a virtual reality headset, or an augmented reality headset.

Example 80. The device of any of examples 62 to 77, wherein the one or more processors are integrated in a vehicle, the vehicle further including the first microphone and the second microphone, and wherein the first microphone is positioned to capture utterances of an operator of the vehicle.

Example 81. A method of voice activity detection including: receiving, at one or more processors, audio data including first audio data corresponding to a first output of a first microphone and second audio data corresponding to a second output of a second microphone; providing, at the one or more processors, the audio data to a dynamic classifier to generate a classification output corresponding to the audio data; and determining, at the one or more processors and at least partially based on the classification output, whether the audio data corresponds to user voice activity.

Example 82. The method of example 81, wherein the classification output is based on a gain difference between the first audio data and the second audio data, a phase difference between the first audio data and the second audio data, or a combination thereof.

Example 83. The method of example 81 or 82, wherein the dynamic classifier includes a self-organizing map.

Example 84. The method of any of examples 81 to 83, wherein determining whether the audio data corresponds to the user voice activity is further based on at least one of a sign or a magnitude of at least one value of feature data corresponding to the audio data.

Example 85. The method of any of examples 81 to 84, further including initiating a voice command processing operation in response to a determination that the audio data corresponds to the user voice activity.

Example 86. The method of example 85, further including generating at least one of a wakeup signal or an interrupt to initiate the voice command processing operation.

Example 87. The method of any of examples 81 to 86, further including transmitting the audio data to a second device in response to a determination that the audio data corresponds to the user voice activity based on the dynamic classifier.

Example 88. A non-transitory computer-readable medium including instructions that, when executed by one or more processors, cause the one or more processors to: receive audio data including first audio data corresponding to a first output of a first microphone and second audio data corresponding to a second output of a second microphone; provide the audio data to a dynamic classifier to generate a classification output corresponding to the audio data; and determine, at least partially based on the classification output, whether the audio data corresponds to user voice activity.

Example 89. The non-transitory computer-readable medium of example 88, wherein the classification output is based on a gain difference between the first audio data and the second audio data, a phase difference between the first audio data and the second audio data, or a combination thereof.

Example 90. An apparatus including: means for receiving audio data including first audio data corresponding to a first output of a first microphone and second audio data corresponding to a second output of a second microphone; means for generating, at a dynamic classifier, a classification output corresponding to the audio data; and means for determining, at least partially based on the classification output, whether the audio data corresponds to user voice activity.

Example 91. The apparatus of example 90, wherein the classification output is based on a gain difference between the first audio data and the second audio data, a phase difference between the first audio data and the second audio data, or a combination thereof.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
a memory configured to store audio data; and
one or more processors configured to:
receive the audio data including first audio data corresponding to a first output of a first microphone and second audio data corresponding to a second output of a second microphone;
provide the audio data to a dynamic classifier, the dynamic classifier configured to generate a classification output corresponding to the audio data; and
determine, at least partially based on the classification output and a verification input, whether the audio data corresponds to a self-voice activity or other sound activity, wherein the verification input is based on at least one prior verification criterion, and the prior verification criterion is based on a magnitude and a sign of intensity differences of between the first audio data and the second audio data.

2. The device of claim 1, further comprising the first microphone and the second microphone, wherein the first microphone is coupled to the one or more processors and configured to capture utterances of a user, and wherein the second microphone is coupled to the one or more processors and configured to capture ambient sound, wherein the utterances corresponds to the self-voice activity.

3. The device of claim 1, wherein the classification output is based on a gain difference between the first audio data and the second audio data, a phase difference between the first audio data and the second audio data, or a combination thereof.

4. The device of claim 1, wherein the one or more processors are further configured to generate feature data based on the first audio data and the second audio data, wherein the audio data is provided to the dynamic classifier as the feature data, and wherein the classification output is based on the feature data.

5. The device of claim 4, wherein the feature data includes:
at least one interaural phase difference between the first audio data and the second audio data; and
at least one interaural intensity difference between the first audio data and the second audio data.

6. The device of claim 4, wherein the one or more processors are further configured to transform the first audio data and the second audio data to a transform domain prior to generating the feature data, and wherein the feature data includes interaural phase differences for multiple frequencies and interaural intensity differences for multiple frequencies.

7. The device of claim 4, wherein the dynamic classifier is configured to adaptively cluster sets of feature data based on whether a sound represented in the audio data originates from a source that is closer to the first microphone than to the second microphone.

8. The device of claim 1, wherein the one or more processors are further configured to update a clustering operation of the dynamic classifier based on the audio data.

9. The device of claim 1, wherein the one or more processors are further configured to update a classification decision criterion of the dynamic classifier.

10. The device of claim 1, wherein the dynamic classifier includes a self-organizing map.

11. The device of claim 1, wherein the dynamic classifier is further configured to receive a sequence of sets of audio data and to adaptively cluster a set of the sequence at least partially based on a prior set of audio data in the sequence.

12. The device of claim 1, wherein the one or more processors are further configured to initiate a voice command processing operation in response to a determination that the audio data corresponds to the self-voice activity.

13. The device of claim 12, wherein the one or more processors are configured to generate at least one of a wakeup signal or an interrupt to initiate the voice command processing operation.

14. The device of claim 13, wherein the one or more processors further include:
an always-on power domain that includes the dynamic classifier; and
a second power domain that includes a voice command processing unit, and wherein the wakeup signal is configured to transition the second power domain from a low-power mode to activate the voice command processing unit.

15. The device of claim 1, further comprising a modem coupled to the one or more processors, the modem configured to transmit the audio data to a second device in response to a determination that the audio data corresponds to the self-voice activity based on the dynamic classifier.

16. The device of claim 1, wherein the one or more processors are integrated in a headset device that includes the first microphone and the second microphone, and wherein the headset device is configured, when worn by a user, to position the first microphone closer than the second microphone to the user's mouth to capture utterances of the user at the first microphone with greater intensity and less delay as compared to at the second microphone, wherein the utterances corresponds to the self-voice activity.

17. The device of claim 1, wherein the one or more processors are integrated in at least one of a mobile phone, a tablet computer device, a wearable electronic device, a camera device, a virtual reality headset, or an augmented reality headset.

18. The device of claim 1, wherein the one or more processors are integrated in a vehicle, the vehicle further including the first microphone and the second microphone, and wherein the first microphone is positioned to capture utterances of an operator of the vehicle, wherein the utterances corresponds to the self-voice activity, and the audio data corresponds to other sound activity in the vehicle.

19. A method of voice activity detection comprising:
receiving, at one or more processors, audio data including first audio data corresponding to a first output of a first microphone and second audio data corresponding to a second output of a second microphone;
providing, at the one or more processors, the audio data to a dynamic classifier to generate a classification output corresponding to the audio data; and
determining, at the one or more processors and at least partially based on the classification output and a verification input, whether the audio data corresponds to a self-voice activity or other sound activity, wherein the verification input is based on at least one prior verification criterion, and the prior verification criterion is based on a magnitude and a sign of intensity differences of between the first audio data and the second audio data.

20. The method of claim 19, wherein the classification output is based on a gain difference between the first audio data and the second audio data, a phase difference between the first audio data and the second audio data, or a combination thereof.

21. The method of claim 19, wherein the dynamic classifier includes a self-organizing map.

22. The method of claim 19, further comprising initiating a voice command processing operation in response to a determination that the audio data corresponds to the self-voice activity.

23. The method of claim 22, further comprising generating at least one of a wakeup signal or an interrupt to initiate the voice command processing operation.

24. The method of claim 19, further comprising transmitting the audio data to a second device in response to a determination that the audio data corresponds to the self-voice activity based on the dynamic classifier.

25. A non-transitory computer-readable medium comprising instructions that, when executed by one or more processors, cause the one or more processors to:

receive audio data including first audio data corresponding to a first output of a first microphone and second audio data corresponding to a second output of a second microphone;
provide the audio data to a dynamic classifier to generate a classification output corresponding to the audio data; and
determine, at least partially based on the classification output and a verification input, whether the audio data corresponds to a self-voice activity or other sound activity, wherein the verification input is based on at least one prior verification criterion, and the prior verification criterion is based on a magnitude and a sign of intensity differences of between the first audio data and the second audio data.

26. The non-transitory computer-readable medium of claim 25, wherein the classification output is based on a gain difference between the first audio data and the second audio data, a phase difference between the first audio data and the second audio data, or a combination thereof.

27. An apparatus comprising:
means for receiving audio data including first audio data corresponding to a first output of a first microphone and second audio data corresponding to a second output of a second microphone;
means for generating, at a dynamic classifier, a classification output corresponding to the audio data; and
means for determining, at least partially based on the classification output and a verification input, whether the audio data corresponds to a self-voice activity or other sound activity, wherein the verification input is based on at least one prior verification criterion, and the prior verification criterion is based on a magnitude and a sign of intensity differences of between the first audio data and the second audio data.

28. The apparatus of claim 27, wherein the classification output is based on a gain difference between the first audio data and the second audio data, a phase difference between the first audio data and the second audio data, or a combination thereof.

* * * * *